(12) United States Patent
Uchida et al.

(10) Patent No.: US 6,526,036 B1
(45) Date of Patent: Feb. 25, 2003

(54) MOBILE COMMUNICATION SYSTEM

(75) Inventors: Yoshinori Uchida, Tokyo (JP); Shinji Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/254,714
(22) PCT Filed: Aug. 20, 1997
(86) PCT No.: PCT/JP97/02890
§ 371 (c)(1),
(2), (4) Date: Mar. 12, 1999
(87) PCT Pub. No.: WO99/09680
PCT Pub. Date: Feb. 25, 1999

(51) Int. Cl.[7] .............................. H04B 7/216; H04J 1/00
(52) U.S. Cl. .................... 370/342; 370/343; 370/320; 370/330; 370/335
(58) Field of Search ................................. 370/321, 310, 370/329, 320, 319, 335, 336, 337, 342, 343, 345, 348, 441, 442, 443, 326

(56) References Cited

U.S. PATENT DOCUMENTS

| | | | | |
|---|---|---|---|---|
| 4,641,304 A | * | 2/1987 | Raychaudhuri | 370/447 |
| 4,785,450 A | * | 11/1988 | Bolgiano et al. | 370/329 |
| 4,803,679 A | * | 2/1989 | Shimizu | 370/431 |
| 5,181,200 A | * | 1/1993 | Harrison | 340/7.25 |
| 5,297,142 A | * | 3/1994 | Paggeot et al. | 340/825.5 |
| 5,384,777 A | * | 1/1995 | Ahmadi et al. | 370/337 |
| 5,410,568 A | | 4/1995 | Schilling | |
| 5,515,366 A | * | 5/1996 | Chieu et al. | 370/347 |
| 5,577,024 A | * | 11/1996 | Malkamaki et al. | 370/335 |
| 5,638,399 A | * | 6/1997 | Schuchman et al. | 342/353 |
| 5,648,955 A | * | 7/1997 | Jensen et al. | 370/252 |

* cited by examiner

*Primary Examiner*—Wellington Chin
*Assistant Examiner*—William Schultz
(74) *Attorney, Agent, or Firm*—Rothwell, Figg, Ernst & Manbeck

(57) ABSTRACT

In a mobile communication system in which a TDMA system and a time-divided CDMA system are commonly used, a high-speed TDMA data transmission system is introduced, and down-links, from base stations (1 to 3) to mobile stations (31 to 34, 41, 42, 51 and 52) and up-links, from mobile stations to base stations, comprise different communication capacities from each other and a couple of a down-link and an up-link having different communication capacities are handled as one communication channel (asymmetric channel). A mobile communication system which is to transmit a large quantity of high-speed data and is able to correspond to multimedia circumstances may be realized by assigning the above-mentioned asymmetric channel to the mobile communication system.

43 Claims, 19 Drawing Sheets

FIG.13

| TIME SLOT NUMBER | POSITIONS OF SWITCH 144 AND SWITCH 149 IN SIGNAL PROCESSING UNIT 1 | SYMMETRY/ ASYMMETRY | POSITIONS OF SWITCH 154 AND SWITCH 159 IN SIGNAL PROCESSING UNIT 2 | SYMMETRY/ ASYMMETRY |
|---|---|---|---|---|
| $T_0$ | 4T(TDMA CONTROL CHANNEL#62-T0) | SYMMETRY | 7T(HIGH-SPEED TDMA#71-T0) | ASYMMETRY |
| $T_1$ | 1T(TIME-DIVIDED CDMA#61-T1) | SYMMETRY | 7T(HIGH-SPEED TDMA#71-T1) | ASYMMETRY |
| $T_2$ | 3T(HIGH-SPEED TDMA#71-T2) | ASYMMETRY | 5T(TIME-DIVIDED CDMA#61-T2) | ASYMMETRY |
| $T_3$ | 3T(HIGH-SPEED TDMA#71-T3) | ASYMMETRY | 5T(TIME-DIVIDED CDMA#61-T3) | ASYMMETRY |
| $R_0$ | 4R(TDMA CONTROL CHANNEL#62-R0) | SYMMETRY | 5R(TIME-DIVIDED CDMA#61-R0) | ASYMMETRY |
| $R_1$ | 1R(TIME-DIVIDED CDMA#61-R1) | SYMMETRY | 6R(TDMA#62-R1) | ASYMMETRY |
| $R_2$ | 1R(TIME-DIVIDED CDMA#61-R2) | ASYMMETRY | 7R(HIGH-SPEED TDMA#71-R2) | ASYMMETRY |
| $T_7$ | 3R(HIGH-SPEED TDMA#71-T7A) | ASYMMETRY | 7T(HIGH-SPEED TDMA#71-T7B) | ASYMMETRY |

NOTE 1 : 1T TO 8T AND 1R TO 8R IN THE ABOVE TABLE SHOW CHANNELS TO WHICH SWITCHES 144,149,154 AND 159 SHOWN IN FIG.12 ARE CHANGED OVER.
NOTE 2 : #71-R3, ETC. SHOW CHANNEL NUMBERS SHOWN BY THE COMBINATION OF TIME SLOTS AND FREQUENCIES SHOWN IN FIG.3.
TIME SLOT NUMBERS ARE ALSO SHOWN IN FIG.3.
NOTE 3 : 4 LINKS OUT OF TIME-DIVIDED CDMA #61-R1 ARE ASSIGNED TO UP-LINKS CORRESPONDING TO 4 DOWN-LINKS, HIGH-SPEED TDMA #71-T3, T7A, T7B AND TIME-DIVIDED CDMA #61-T3.
THE FUNCTION TO RECEIVE THESE 4 LINKS IS EXECUTED IN ANOTHER SIGNAL PROCESSING UNIT. (IT IS NOT SHOWN IN FIG.12 AND FIG.13.)

FIG.15

| MOBILE STATION SUBSCRIBER'S NUMBER | MOBILE STATION IDENTIFICATION NUMBER | MOBILE STATION POSITION, CELL AND ZONE | TRANSMISSION/ RECEPTION POSSIBLE FREQUENCY BAND | SERVICEABLE TRANSMISSION TYPE |
|---|---|---|---|---|
| DS51-727 | 727-5197 | 727-12 | SAME AS SYSTEM BANDWIDTH | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : TRANSMISSION/RECEPTION<br>4. LOW-SPEED TDMA CONTROL CHANNEL<br>5. LOW-SPEED TIME-DIVIDED CDMA CONTROL CHANNEL |
| DS52-728 | 728-5297 | 728-23 | SAME AS SYSTEM BANDWIDTH | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : RECEPTION ONLY<br>4. LOW-SPEED TDMA CONTROL CHANNEL<br>5. LOW-SPEED TIME-DIVIDED CDMA CONTROL CHANNEL |
| MS32-728 | 728-5132 | 728-23 | SYSTEM FREQUENCY BANDWIDTH EXCEPT HIGH-SPEED COMMUNICATION BANDWIDTH | 1. TDMA VOICE FREQUENCY/LOW-SPEED DATA<br>2. TIME-DIVIDED CDMA VOICE FREQUENCY/LOW-SPEED DATA<br>4. LOW-SPEED TDMA CONTROL CHANNEL<br>5. LOW-SPEED TIME-DIVIDED CDMA CONTROL CHANNEL |
| WS42-727 | 727-5142 | 727-13 | SAME AS SYSTEM BANDWIDTH | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : TRANSMISSION/RECEPTION<br>4. LOW-SPEED TDMA CONTROL CHANNEL<br>5. LOW-SPEED TIME-DIVIDED CDMA CONTROL CHANNEL |

FIG.17

| CALL ORIGINATING DATABASE NAME | OLDEST RECEPTION TIME IN RESIDUAL INFORMATION RECEIVED FROM DATABASE | MOBILE STATION SUB- SCRIBER'S NUMBER | LATEST TRANSMISSION TIME TO MOBILE STATION | STORED INFOR- MATION NUMBER AT THE HEAD OF RESIDUAL INFOR- MATION AND LAST STORED INFORMATION NUMBER AT THE END OF IT | RESIDUAL INFOR- MATION QUANTITY | OTHERS (CORRE- SPONDING CONTROL SYSTEM) |
|---|---|---|---|---|---|---|
| ENVIRONMENT DATABASE | 1997-06-09:12.10:45 | DS51-727 | 1997-06-09:12.12:20 | AA-BF | 2Mbyte | TD-CDMA |
| ITALIAN SIGHT- SEEING ASSOCI- ATION DATABASE | 1997-06-09:12.20:15 | WS42-727 | 1997-06-09:12.30:00 | DD-FH | 12Mbyte | LOW-SPEED TDMA |
| | | | | | | |

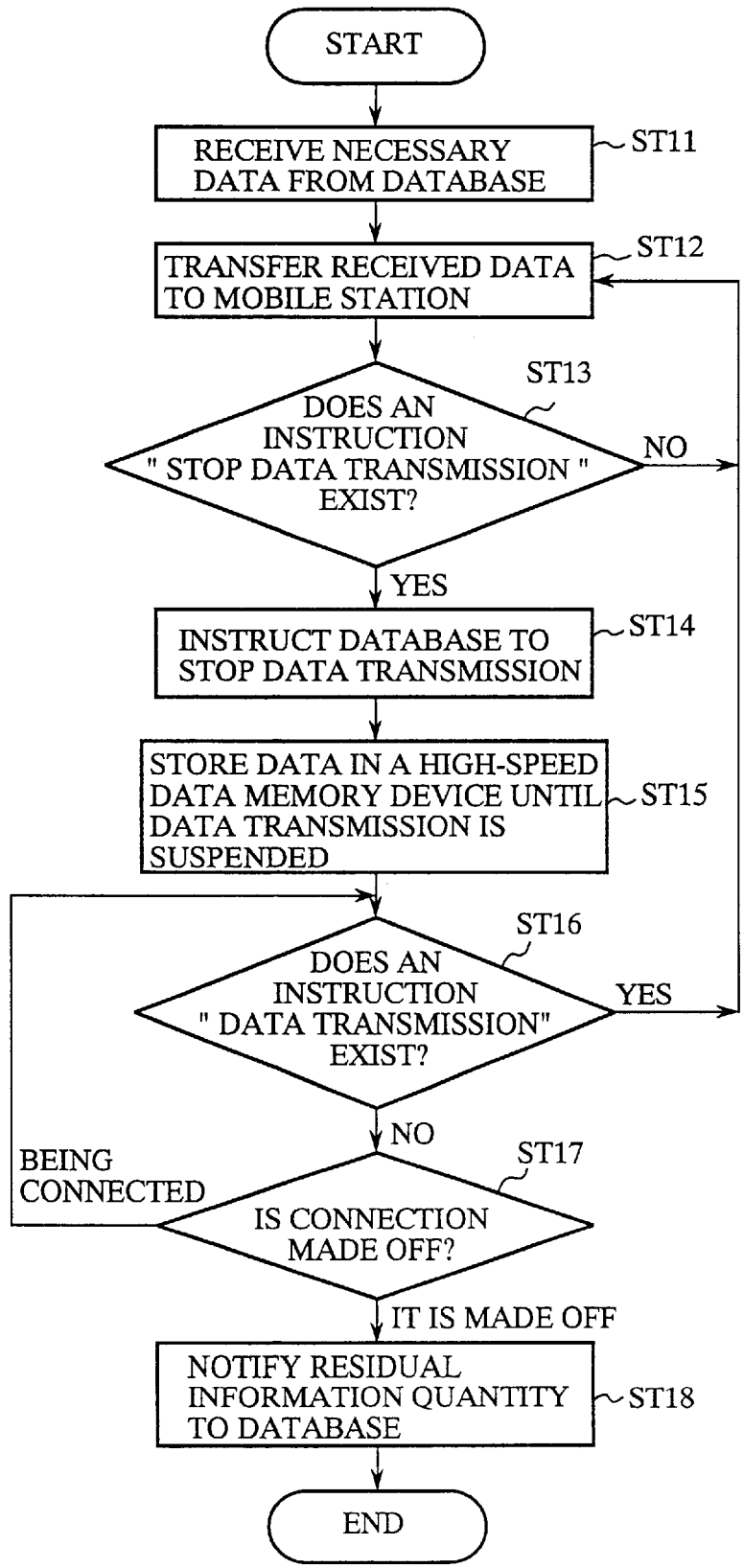

FIG.19

| BASE STATION BS1 | | | | | |
|---|---|---|---|---|---|
| MOBILE STATION NAME | BASE STATION ID | UP-LINK /DOWN-LINK | TRANSMISSION TYPE | TIME SLOT NAME | OTHERS |
| DS51-727 ZONE12 | 727-5197 | UP-LINK | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : TRANSMISSION/RECEPTION<br>4. CONTROL INFORMATION CHANNEL FOR INTERMITTENT CONNECTION<br>5. LOW-SPEED TDMA CONTROL CHANNEL<br>6. LOW-SPEED TIME DIVIDED CDMA CONTROL CHANNEL | #61-R2-07<br>#71-R2<br>#61-R2-01:25<br><br><br>#61-R0-17 | |
| | | DOWN-LINK | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : TRANSMISSION/RECEPTION<br>4. CONTROL INFORMATION CHANNEL FOR INTERMITTENT CONNECTION<br>5. LOW-SPEED TDMA CONTROL CHANNEL<br>6. LOW-SPEED TIME DIVIDED CDMA CONTROL CHANNEL | #61-T2-07<br>#71-T2<br>#61-T2-01:25<br><br><br>#61-T0-17 | |
| WS42-727 ZONE13 | 727-5142 | UP-LINK | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : TRANSMISSION/RECEPTION<br>4. CONTROL INFORMATION CHANNEL FOR INTERMITTENT CONNECTION<br>5. LOW-SPEED TDMA CONTROL CHANNEL<br>6. LOW-SPEED TIME DIVIDED CDMA CONTROL CHANNEL | #61-R3-12<br>#71-R3<br>#61-R3-05:36<br><br><br>#61-R0-02 | |
| | | DOWN-LINK | 1. TDMA VOICE FREQUENCY/LOW-SPEED DATA<br>2. TIME-DIVIDED CDMA VOICE FREQUENCY/LOW-SPEED DATA<br>3. HIGH-SPEED TDMA DATA : TRANSMISSION/RECEPTION<br>4. CONTROL INFORMATION CHANNEL FOR INTERMITTENT CONNECTION<br>5. LOW-SPEED TDMA CONTROL CHANNEL<br>6. LOW-SPEED TIME DIVIDED CDMA CONTROL CHANNEL | #61-T3-12<br>#71-T3<br>#61-T3-05:36<br><br><br>#61-T0-02 | |

MOBILE COMMUNICATION SYSTEM

TECHNICAL FIELD

The present invention relates to a mobile communication system sharing of a frequency channel or a time slot and using a time division multiple access system (hereinafter referred to as TDMA) and/or a time division, code division multiple access system (hereinafter referred to as time divided CDMA), and in particular, it relates to a mobile communication system comprising a function in which a set of links, an up-link and a down-link, having different communication capacities from each other may be handled as a single communication channel (hereinafter referred to as an asymmetric communication channel).

BACKGROUND ART

A mobile communication system is mainly constituted with a mobile communication equipment or a portable communication equipment and a base station which communicates with mobile stations through radio channels. In such a mobile communication system, the common use of a radio frequency spectrum by different radio systems may be executed in a frequency division multiple access system (hereinafter referred to as an FDMA) or between a TDMA system and a CDMA system.

The common use of a frequency channel by different code systems has been put into an actual operation concerning the CDMA system.

A mobile communication system of a time slot common use type in which at least a TDMA signal and at least a time divided CDMA signal coexist in a time slot is disclosed in U.S. application Ser. No. 08/524,974 which is separately applied by the same applicant as the present invention, however, an asymmetrical communication channel is not all at referred to in the application.

Technologies for mobile communication systems in which a time slot is commonly used and a frequency channel is also commonly used, and further, technologies for synchronizing radio base stations by a wireless local loop (hereinafter referred to as WLL) using semi-fixed communication equipment are known in the art. However, in these technologies, an asymmetric channel in which capacities of an up-link and a down-link are different is not known.

The U.S. Pat. No. 5,363,403 is known as a system in which a plurality of CDMA signals are commonly used. However, in the specification, nothing is described concerning the way of handling a time divided CDMA. The U.S. Pat. No. 5,511,068 is also known as another mobile communication system, however, it is related to an adaptive filter in a time divided CDMA system and in the specification nothing is nothing refers to the common use of a frequency channel of a CDMA signal and a TDMA signal in a single time slot.

As a communication system in which a TDMA technology is applied to a CDMA communication system, the U.S. Pat. No. 5,410,568 is known. In the patent, a synchronization code is placed at the head of a burst signal. The patent does not refer to a system in which a time divided CDMA system is introduced using a TMDA control channel for setting frame synchronization, and nothing refers to coexistence with a TDMA system. In other words, it is not a patent in which TDMA system and a time divided CDMA system are to be used in common using a TDMA frame. Further, no consideration is paid for an asymmetrical channel in which the capacity of an up-channel is different from that of a downchannel.

Besides the above-mentioned ones, JP-A-63/175526, JP-A63/175527, JP-A-5/145477, JP-A-7/154866, and JP-A-8/186533, and so on are known.

However, in the above-mentioned JP-A-63/175526 and JP-A63/175527, it is intended to send more signals under the condition that the transmitting power of a transponder in a satellite communication is limited, but in the case of a mobile communication on land, such a limitation does not exist. Furthermore nothing describes a time divided CDMA system or a high speed TDMA. JP-A-5/145477 is related to the control of transmitting power of a signal in a TDMA time slot, and nothing refers to the time divided CDMA and TDMA communication systems.

The above-mentioned JP-A-7/154866 and JP-A-8/186533 are applications in which a set of links, an up-link and a down-link of having different capacities from each other may be handled as a communication channel. In the former, however, there is no concrete description about a high speed TDMA data transmission or a low speed time-divided CDMA data/voice frequency signal transmission, and nothing refers to a control information channel for intermittent connection which connects a user and a database during the consideration of the user or to the increase or decrease of a guard time in the unit of a micro time slot in a high speed TDMA data transmission channel. In the latter, as understood from the explanation of an aloha with a slot, it is premised on a packet communication system, and the time ratio of an up-link to a down-link in a time division duplex communication system can be variable, but it does not vary the time ratio of the up-link to down-link in a TDMA-TDD frame. Therefore, nothing refers to the coexistence of a plurality of TDMA signals, high speed TDMA data transmission and time divided CDMA in a time slot.

As mentioned in the above, there are many kinds of systems being constituted of one or more base stations which communicate with a plurality of mobile stations through radio channels using a TDMA system and a time divided CDMA system have been known. In these mobile communication systems, there has been a demand to introduce a high speed data communication system, however, a mobile communication system which is able to correspond such a demand has not been realized.

In order to make a mobile communication system to be able to correspond to a multimedia communication, it is needed to introduce a communication channel in which the communication capacity in an up-link and that in a down-link are different.

The present invention was made to solve the problems as mentioned in the above, and the object of the present invention is to realize a mobile communication system which is able to correspond to a multimedia environment, wherein a high speed TDMA channel is introduced to a mobile communication system in which a TDMA signal and a time divided CDMA signal coexist, and furthermore, communication links having different communication capacities in an up-link and a down-link may be handled as a single communication channel.

DISCLOSURE OF THE INVENTION

A mobile communication system described in claim 1 according to the present invention is the one in which a high speed data channel is introduced and the communication channel is made to be an asymmetric one in which the communication capacity of the up-link and that of the down-link are different from each other. Thereby, it is made possible to change over the communication speed in the unit of a frame length, which has been needed by customers, and to realize a mobile communication system which is able to flexibly adapt to the variation in communication capacity, which has been required by the multimedia environment.

A mobile communication system described in claim 2 according to the present invention is one in which the ratio of the communication capacity of an up-link to that of a down-link is varied by shifting a frame time, a TDD line in a frequency axis, in the direction of the time axis.

A mobile communication system described in claim 3 according to the present invention is the one comprising an asymmetric communication channel in which the down-link is assigned a high speed TDMA data channel and the up-link is assigned a low speed TDMA data channel.

A mobile communication system described in claim 4 according to the present invention is an asymmetric communication system in which the down-link is assigned a high speed TDMA data channel and the up-link is assigned a low speed time divided CDMA data channel.

A mobile communication system described in claim 5 according to the present invention is an asymmetric communication system in which the down-link is assigned a low speed TDMA data channel and the up-link is assigned a high speed TDMA data channel.

A mobile communication system described in claim 6 according to the present invention is an asymmetric communication system in which the down-link is assigned a low speed time divided CDMA data channel and the up-link is assigned a high speed TDMA data channel.

A mobile communication system described in claim 7 according to the present invention comprises at least a TDMA burst signal and at least a time divided CDMA burst signal, with both of them or either of them being used as a control channel.

A mobile communication system described in claim 8 according to the present invention is provided with a mobile switching center for the management of an asymmetric channel, and the switching center is so designed to be able to instruct at least one base station to change the information quantity in an up-link and a down-link.

A mobile communication system described in claim 9 according to the present invention comprises an asymmetric communication channel, and as soon as the transmission of a large information quantity of data is finished, the data channel for the transmission of a large quantity of data is switched to a data channel for the transmission of a small quantity of data. Thereby, the situation is avoided in which a communication channel for the transmission of a large quantity of data is needlessly occupied while data are not actually transmitted.

A mobile communication system described in claim 10 according to the present invention in which when a base station is connected to a mobile station with a channel for small quantity of data, if there is no transmission of data through the channel for a predetermined period of time, the channel is switched to a control channel for connection.

A mobile communication system described in claim 11 according to the present invention in which when a base station is connected to a mobile station with a control channel for connection, if there occurs a demand for the transmission of a large quantity of information data, the channel may be immediately switched to a transmission channel for a large quantity of data.

A mobile communication system described in claim 12 according to the present invention in which when a base station and a mobile station are connected to each other with a control channel for connection, if there occurs a demand for the transmission of a small quantity of information data, the channel may be immediately switched to a transmission channel for a small quantity of data.

A mobile communication system described in claim 13 according to the present invention in which a base station and a mobile station are connected to each other with a channel for a small quantity of data, if there occurs a demand for the transmission of a large quantity of information data, the channel may be immediately switched to a channel for the transmission of a large quantity of data.

A mobile communication system described in claim 14 according to the present invention in which a mobile switching center is provided to perform the management of an asymmetric channel, and the mobile switching center is able to instruct at least one base station in the switching of an asymmetric channel.

A mobile communication system described in claim 15 according to the present invention comprises an asymmetric channel and further the down-link and the up-link utilizing multi-frames are respectively provided with independent transmission channels for a small quantity of data. During a period of time being used by a user, a period of time for his consideration after his receipt of a lot of information for example, the influence caused by hardware upon the depth or length of the user's consideration is avoided by using a transmission channel for a small quantity of data as a control circuit for intermittent connection to connect the user and a database offerer with minimum control data.

A mobile communication system described in claim 16 according to the present invention in which control data are transmitted using a data channel for a small quantity as a control information channel for an intermittent connection while data are not exchanged between a base station and a mobile station.

A mobile communication system described in claim 17 according to the present invention in which during the period of time till an answer is issued from a mobile station after a large quantity of data is received by the mobile station, control data showing that there is no data being exchanged between the base station and the mobile station are also transmitted in the control information channel for the intermittent connection.

A mobile communication system described in claim 18 according to the present invention in which a mobile switching center is provided for the management of a control information channel, and the mobile switching center is able to instruct at least one base station in starting, switching and discontinuation of the control information channel for intermittent connection.

A mobile communication system described in claim 19 according to the present invention comprises an asymmetric channel, and furthermore, a time slot of a high speed TDMA data channel is constituted with a plurality of micro time slot elements connected in series. Thereby, except the difference in speed, a low speed data processing unit and a high speed data processing unit may be the same constitution, and the constitution of the whole system is simplified and the costs of equipment and design may be decreased. Furthermore, it is made possible to increase or decrease the guard time in the unit of a micro time slot, so that a proper guard time may be set corresponding to the speed of a moving body, which means that interference by another time slot may be avoided and at the same time lowered efficiency may be prevented.

A mobile communication system described in claim 20 according to the present invention in which a micro time slot in a high speed TDMA data channel is formed with the same bit constitution as that of a time slot in a low speed TDMA data channel.

A mobile communication system described in claim 21 according to the present invention in which an equalizer for a high speed TDMA data channel is made to have the same constitution as that for a low speed TDMA data channel except the difference in operating speed.

A mobile communication system described in claim 22 according to the present invention in which the guard time in a high speed TDMA data channel may be varied in the unit of a micro time slot corresponding to the moving speed of a mobile station.

A mobile communication system described in claim 23 according to the present invention is provided with a mobile switching center for the management of the constitution of a micro time slot in a high speed TDMA data channel and the mobile switching center is arranged to be able to instruct at least one base station in the change concerning the constitution including the guard time length of the high speed TDMA data channel.

A mobile communication system described in claim 24 according to the present invention comprises an asymmetric channel, and further switches for selecting a communication system which is able to transmit a necessary information quantity in synchronization with time slots are provided in at least one base station and a plurality of mobile stations. Thereby an asymmetric channel may be realized by assigning channels having different communication systems to each other to a down-link and an up-link in TDD time slots, and it is possible to realize both asymmetry in transmission communication capacity and asymmetry in time.

A mobile communication system described in claim 25 according to the present invention in which a memory is provided to at least one base station, the memory which makes it possible to assign a channel to a down-link and another channel to an up-link independently of each other concerning a single mobile station.

A mobile communication system described in claim 26 according to the present invention is provided with a mobile switching center for the management of the assignment of communication channels, and the mobile switching center is arranged to be able to instruct at least one base station in the assignment of channels.

A mobile communication system described in claim 27 according to the present invention comprises an asymmetric channel, and a mobile switching center is provided with a memory for registering the information of mobile stations managed by the mobile switching center. Thereby, the services to be given to the mobile stations being managed by the mobile switching center may be easily known and the channel assignment may be effectively performed.

A mobile communication system described in claim 28 according to the present invention in which a mobile switching center manages mobile station information concerning the mobile stations being managed by the mobile switching center, and the mobile switching center is able to instruct at least one base station in the starting, switching and discontinuity of services based on the mobile station information.

A mobile communication system described in claim 29 according to the present invention in which a mobile switching center manages the information concerning mobile stations being managed by the mobile exchange, and when a revision in a mobile station information occurs, and the revised information is transferred to the database of the mobile communication system which stores mobile station information in the whole mobile communication system, through at least one public switching telephone network.

A mobile communication system described in claim 30 according to the present invention comprises an asymmetric channel, and a memory device for high speed data communication which temporarily stores high speed data to be transmitted to a mobile unit is provided in a mobile switching center. Thereby, it is made possible to correspond promptly to a request for high speed data transmission from a user, and also a partial loss of high speed data may be prevented.

A mobile communication system described in claim 31 according to the present invention in which when the transmitted high speed data are normally received in a mobile station, a normal time slot number when the end of the high speed data are received is detected in the mobile station and the number is reported to a mobile switching center.

A mobile communication system described in claim 32 according to the present invention in which a mobile switching center manages high speed data transmitted to a mobile station, and the switching center is provided with a function to store high speed data having time slot numbers on and after the number next to the normal slot number transmitted from the mobile station in a memory device to be used for the high speed data communication.

A mobile communication system described in claim 33 according to the present invention in which a mobile switching center performs the management of high speed data to be transmitted to a mobile station, and the switching center is provided with a function as described below: when there is a request from the mobile station to transmit the high speed data again, it reads the high speed data having the time slot number on and after the number next to the normal time slot number out of the memory device to be used for high speed data communication and transmits the high-speed data to the mobile station.

A mobile communication system described in claim 34 according to the present invention in which a mobile switching center is provided with a function as described below: when the high speed data to be transmitted to a mobile station are stored in a memory device to be used for a high speed communication, the mobile switching center divides the high speed data received from the originating end of the high speed data through a public switching telephone network into blocks of information so that each of the blocks is composed of an information quantity which may be transmitted in a time slot and manages the blocks in numbering each block with a storing information number.

A mobile communication system described in claim 35 according to the present invention in which a base station is provided with a function to compare the time slot number of high speed data transmitted to a mobile station with the storage information number marked by the mobile switching center and to combine the information consisting of the time slot number and the storage information number into a set of information and transmit the information the information to the mobile switching center.

A mobile communication system described in claim 36 according to the present invention in which a mobile switching center performs the management of high speed data to be transmitted to a mobile unit, and also it is given a function to erase high speed data having slot numbers previous to the normal time slot number transmitted from the mobile station from the memory device for high speed data communication.

A mobile communication system described in claim 37 according to the present invention in which a mobile switching center performs the management of high speed data to be transmitted to mobile stations and also it is given a function to inform an originating end of the high speed data regarding the information quantity of high speed data having time slot numbers on and after the normal slot number which are left in the memory device for high speed communication to when a mobile unit finishes communication.

A mobile communication system described in claim 38 according to the present invention in which a mobile switching center performs the management of high speed data to be transmitted to mobile units and also it is given a function to request the forwarding of succeeding high speed data to an originating end of the high speed data if the quantity of data left in the memory device for a high speed communication decreases lower than a predetermined level during the transmission of high speed data requested by a mobile station to a base station.

A mobile communication system described in claim 39 according to the present invention in which when transmitted high speed data are not normally received in a mobile station, the mobile station is given a function to detect the slot number of the high speed data and to transfer the slot number as an abnormal slot number to a mobile switching center.

A mobile communication system described in claim 40 according to the present invention in which a mobile switching center performs the management of high speed data to be transmitted to mobile stations and also the switching center is given a function as shown below: when the mobile switching center receives an abnormal time slot number sent from a mobile station, it reads the high speed data having the abnormal time slot number out of a memory device for a high speed data communication and transmit the data again to the mobile station.

A mobile communication system described in claim 41 according to the present invention comprises an asymmetric channel and in which a mobile switching center is provided with a mobile station management memory for storing a communication channel management list for managing communication channels of respective mobile units, and the mobile switching center assigns a time slot corresponding to a transmission type and after the operation assigned to the time slot corresponding to the present transmission type is over, the time slot assignment is kept in the mobile station management memory as history of data, and when the same transmission type is assigned again, the time slot number kept in the memory is used again. Thereby, the up-link and the down-link may be set independently of each other with different types of transmission.

A mobile communication system described in claim 42 according to the present invention in which in a case where the existence of a time slot name of the same transmission type which has the history of actual use in the mobile station management memory is gone, the history of actual use of the slot name in the past is erased from the mobile station management memory, and the time slot is arranged to be assigned for the use of a new mobile station.

A mobile communication system described in claim 43 according to the present invention in which when the history of a time slot which has the history of actual use in the past is going to be erased, a time slot which has the oldest history of actual use is selected and it is arranged to be assigned as a time slot for a new mobile station.

BRIEF DESCRIPTION OF THE DRAWINGS

FIG. 13 shows an illustrative drawing showing the time slot assignment of a switch for the selection of a communication system of an interface unit in a base station in the embodiment 5.

FIG. 15 shows an illustrative drawing showing an example of a mobile station information which is registered in a mobile unit information memory shown in the embodiment 6.

FIG. 17 shows an illustrative drawing showing relevant information which is necessary for the management of the contents of a memory device for a high speed communication in the embodiment 7.

FIG. 18 shows a flow chart of the control process of the memory device for high speed communication in the embodiment 7.

FIG. 19 shows an illustrative drawing showing an example of a communication channel management list of a mobile station in an embodiment 8 in the present invention.

BEST MODE FOR CARRYING OUT THE INVENTION

In order to explain the present invention more in detail, embodiments according to the present invention will be explained referring the attached drawings.

Embodiment 1

Figure 1:
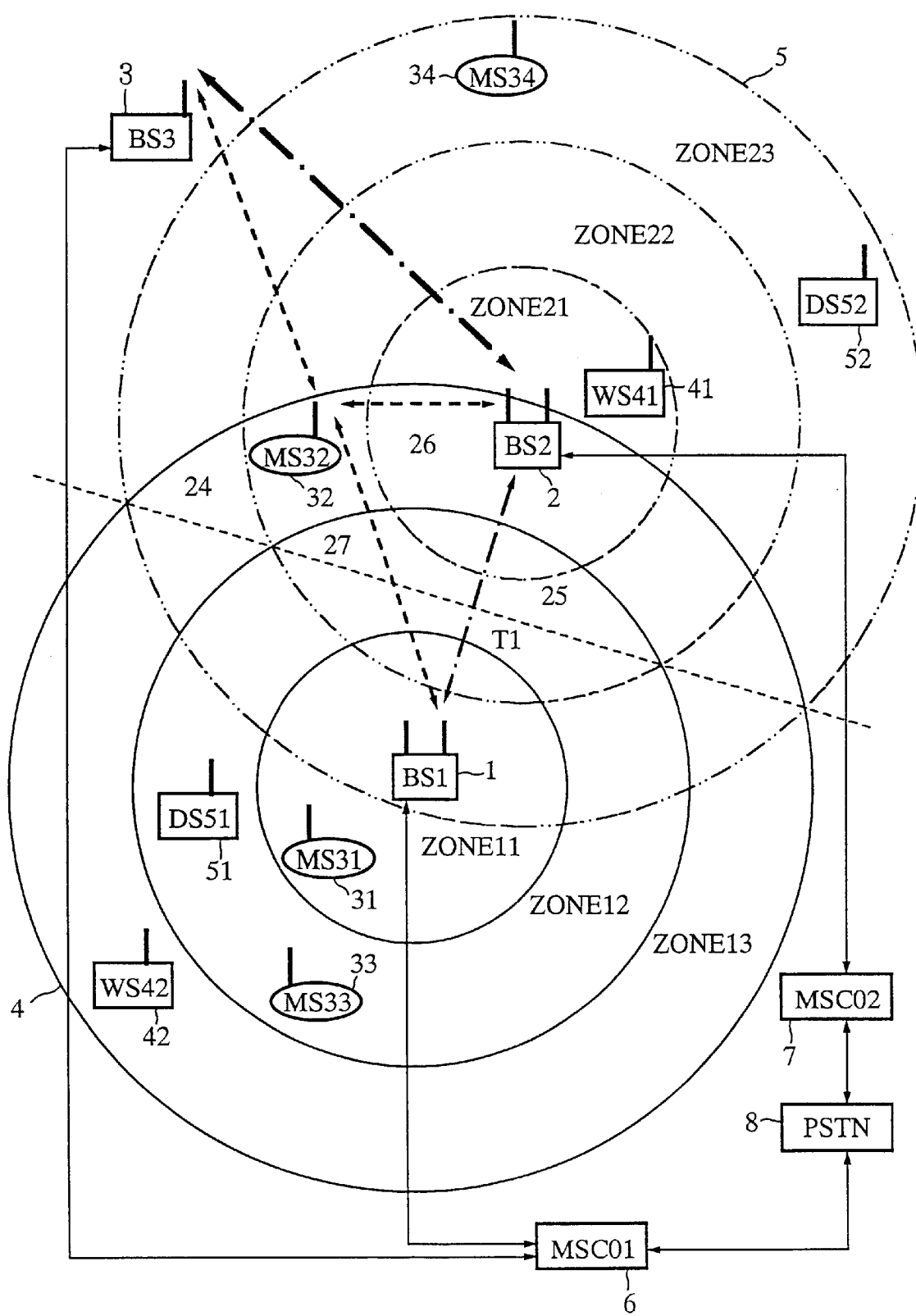
FIG. 1 shows a constitutional drawing which shows the whole constitution of a mobile communication system in an embodiment 1 according to the present invention.

FIG. 1 is a schematic figure of the whole constitution of a mobile communication system to which the common use system of a time slot and the common use system of a frequency channel according to the present invention may be applied. In the drawing, reference numerals 1, 2 and 3 denote base stations, and 4 and 5 denote the covering areas (hereinafter referred to as a cell) of the base stations 1 and 2. A cell 4 includes zones 11, 12 and 13, and a cell 5 includes zones 21, 22 and 23.

Reference numerals 31, 32, 33 and 34 denote ordinary mobile stations (MS) with conventional movable communication equipment, such as mobile communication equipment or portable communication equipment in which the main business is a voice-frequency communication to communicate with the base stations 1 and 2, through radio channels and 41 and 42 are WLL stations (WS) which communicate with base stations 1 and 2 through radio channels. Reference numerals 51 and 52 are multimedia stations (DS), that is, mobile stations or semi-fixed stations which communicate with base stations 1 to 3, through medium/high data-speed TDMA channels. These multimedia stations 51 and 52 comprise the function to perform voice frequency communication or low-speed data communication through a time-divided CDMA channel or a low-speed TDMA data channel besides the above-mentioned medium/high data-speed TDMA channel. In the following explanation, an ordinary mobile station (MS), a WLL station (WS) and a multimedia station (DS) are generally called a mobile station.

A reference numeral 6 denotes a mobile switching center (MSC) which controls the base stations 1 and 3, and 7 denotes a mobile switching center which controls the base station 2. A reference numeral 8 denotes a public switching telephone network (PSTN) which connects mobile switching centers 6 and 7 by wire.

The embodiment 1 relates to a TDMA/time-divided CDMA mobile communication system including mobile stations which communicate with a base station through medium/high-speed TDMA channel. The frame constitution of a mobile communication system comprising a TDMA/time-divided CDMA channel, a high-speed TDMA data transmission channel, and an asymmetric channel will be explained in the following.

In the mobile communication system according to the present invention, mobile stations such as ordinary mobile stations 31 to 34, WLL stations 41 and 42, and multimedia stations 51 and 52, and base stations 1 and 2 are connected by radio systems such as FDMA/time-divided duplex (hereinafter referred to as TDD) system, multi-carriers TDMA system, CDMA/TDD system, TDMA/frequency-divided duplex system (FDD), TDMA/TDD system, time divided CDMA/FDD system, or time-divided CDMA/TDD system using signals modulated by digital modulation systems such as frequency shift keying (FSK), phase shift keying (PSK) such as BPSK, QPSK, DQPSK, π/4-DSPSK, and so on or minimum shift keying (MSK) such as QAMSK, QGMSK, and so on.

A mobile communication system in the embodiment 1 according to the present invention in which a plurality of multimedia stations and a plurality of base stations having a high-speed TDMA transmission function are connected with a high-speed TDMA transmission channel is a mobile communication system of time slot common use and frequency channel common use comprising CDMA signal channel (hereinafter referred to as a common channel) which commonly uses a time slot and a frequency channel with a FDMA/TDMA digital signal on the frequency axis, and is a WLL and movable communication system of a time slot common use and a frequency channel common use comprising a time divided CDMA signal which commonly uses a time slot and a frequency channel (a case where frequency channel is not commonly uses is included) with the TDMA signal.

Figure 2:
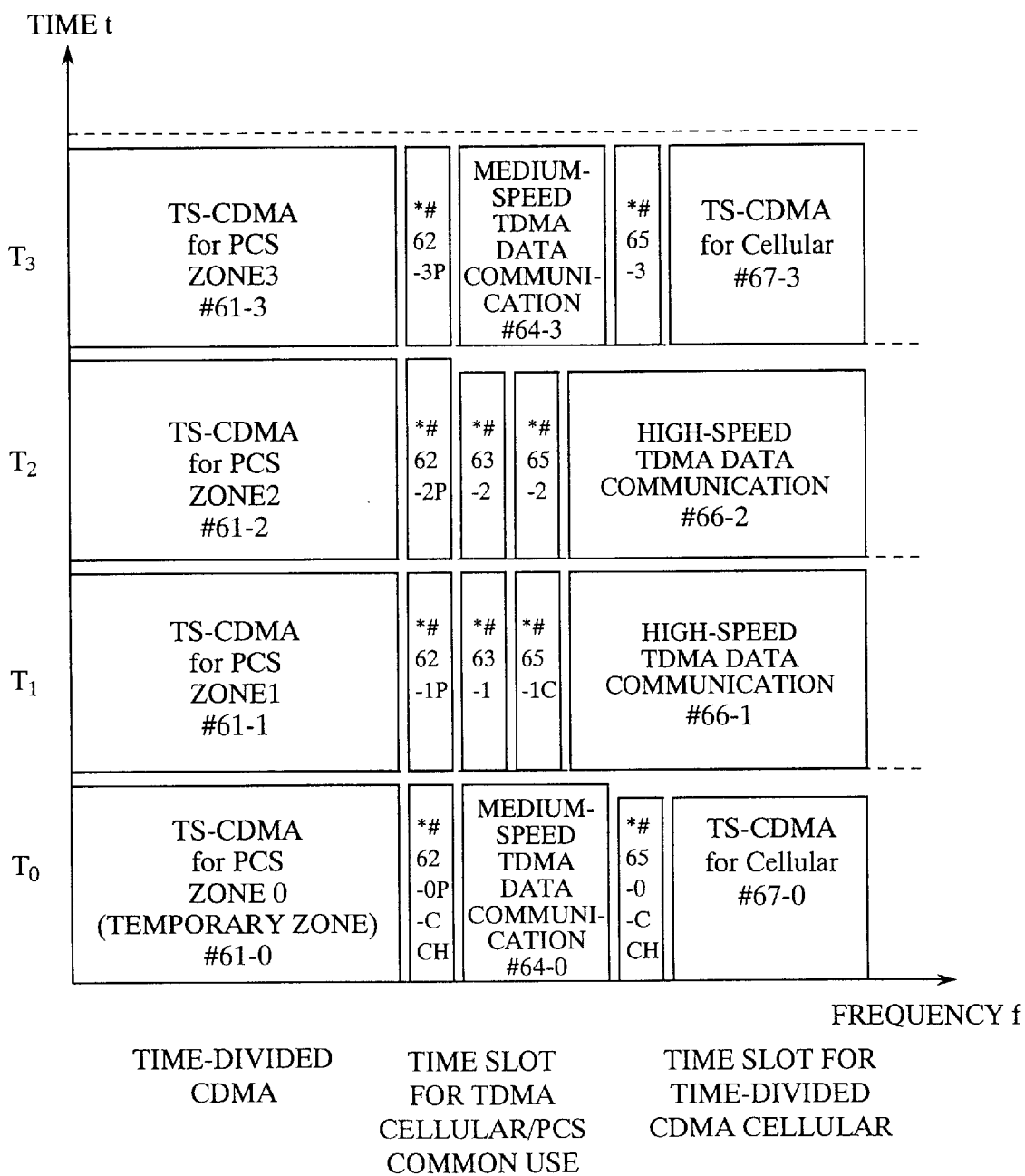
FIG. 2 shows an illustrative drawing showing a personal communication system (hereinafter referred to as PCS) of time divided CDMA, and a time slot constitution for a cellular in the embodiment 1 according to the present invention.

FIG. 2 shows an illustrative drawing showing PCS by a time divided CDMA and the constitution of a time slot for a cellular, in the above only those in the down-link of TDD is shown. In the drawing, #61-0 to #61-3 show time slots for PCS, and #67-0 and #67-3 show time slots for cellular. Also in the drawing, #64-0 and #64-3 show time slots for medium-speed TDMA data communication, and #66-1 and #66-2 show time slots for high-speed TDMA data communication. Other time slots for low-speed TDMA marked with "*", #62-0 to #62-3, #63-1 and #63-2, and #65-0 to 65-3 show an example being used for a voice-frequency data channel, a low-speed data channel, or a control channel.

In the embodiment 1, when a channel is used as a control channel, it comprises at least one TDMA burst signal and/or at least one time divided CDMA burst signal.

Figure 3:
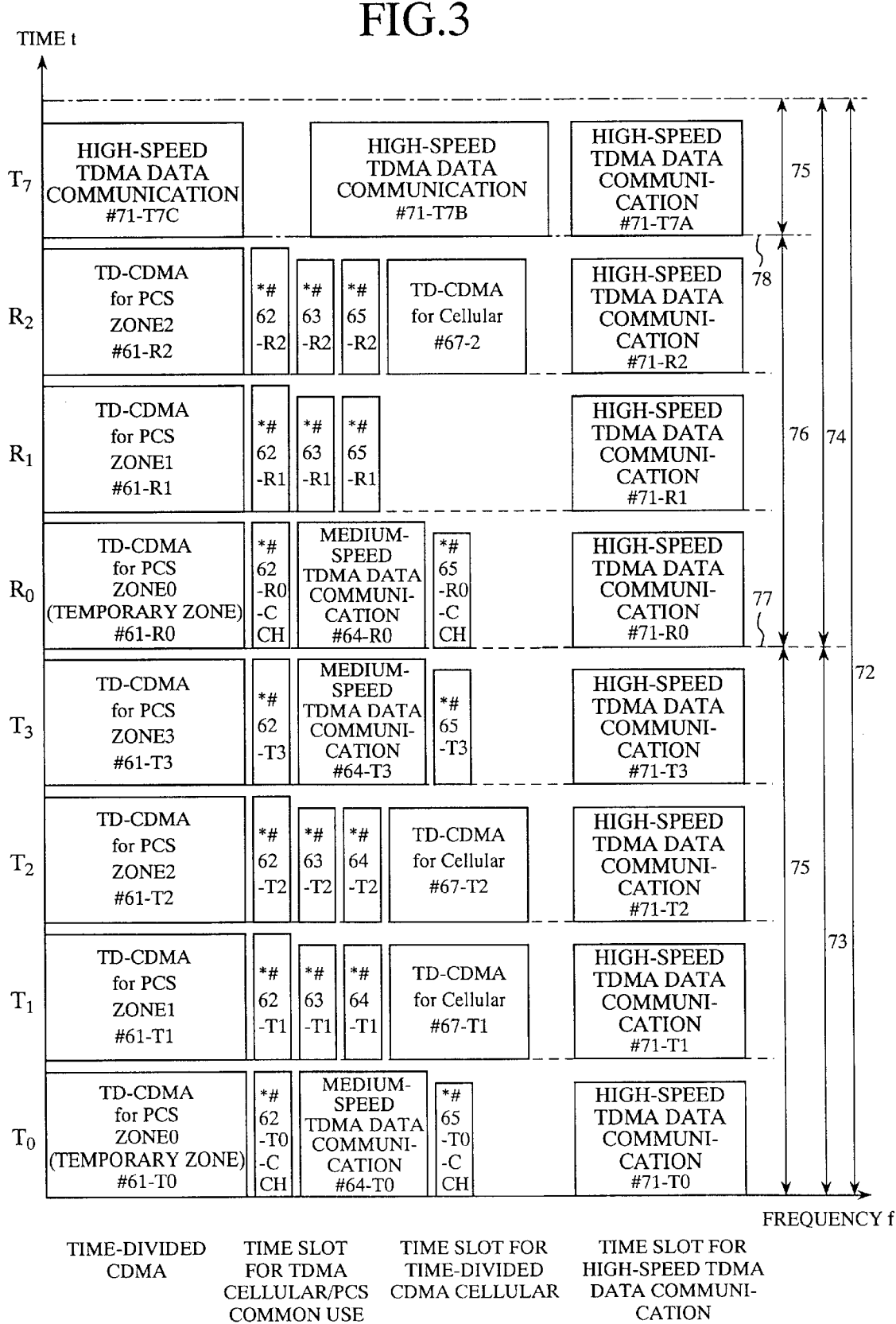
FIG. 3 shows an illustrative drawing showing a time slot constitution which has a different form from that shown in FIG. 2 in the embodiment 1.

FIG. 3 is an illustrative drawing showing a time slot constitution of a different form from that shown in FIG. 2, and it shows a state where the down-link T is added in an asymmetric mobile communication system such as a high-speed TDMA data transmission system in which transmission capacity of the up-link is different from that of down-link. In the drawing, parts denoted by the same reference numerals as those shown in FIG. 2 have the same functions, so that the explanation of them will be omitted. In the drawing, #71-T0 to #71-T3, and #71-T7A, #71-T7B and #71-T7C are time slots for high-speed TDMA data communication assigned to the down link from a base station to mobile stations, and #71-R0 to #71-R2 are time slots to be used for the up-link from mobile stations to the base station.

In FIG. 3, a reference numeral 72 denotes one frame length, and 73 and 74 denote half-frame lengths of a time divided CDMA channel, a low-speed TDMA channel and a medium-speed TDMA channel in the above-mentioned frame. A reference numeral 75 denotes a frame length (4+1 time-slot length) for the down-link from a base station to mobile stations, and 76 denotes a frame length (3 time-slot length) of a high-speed TDMA data channel for the up-link from mobile stations to a base station. Reference numerals 77 and 78 are TDD lines shown in a chart expressed by frame time axis and frequency axis which forms a border line between the down-link from a base station to mobile stations and the up-link from mobile stations to the base station.

In this case, there is asymmetry between the up-link and the down-link where respective channels have different transmission capacities from each other. In an ordinary case, the up-link from mobile stations to a base station, and the down-link from a base station to mobile stations have the same transmission capacity. Asymmetric high-speed TDMA data transmission channels, #71-T0 to #71-T3, #71-T7A, #71-T7B and #71-T7C, and #71-R0 to #71-R2 as shown in FIG. 3 show an example of time slot constitution for realizing the above-mentioned request. The process of occurrence of such circumstances will be explained in the following.

Multimedia is the subject of a mobile communication system in the embodiment 1, and in particular the case where the down-link of a high-speed TDMA data channel may be used for the transmission of a large quantity of data to users such as image information or data bank information will be considered. In such a case, when a user accesses to a data bank or a home page, the down-link is useful for the transmission of a large quantity of data from a data source to the user in a short time. On the other hand, even when a user receives such a large quantity of data it will be rare that he reads and understands and reaches a conclusion immediately and send the data back to the above-mentioned originating source of the data, and in particular when the user is a natural person such a case will be difficult to consider.

In other words, after the reception of a large quantity of data by a personal user a long period of time is generally necessary before answering data is sent back. Therefore, even though a transmission channel for a large quantity of data is needed for a down-link, just right after the reception of the large quantity of data there will be no need to set a transmission channel for a large quantity of data in the up-link. Accordingly, asymmetry in data transmission capacity occurs temporarily between the up-link and the down-link; therefore, it is necessary to have a time slot constitution being matched to the circumstances. An example of it will be shown in FIG. 4.

Figure 4:
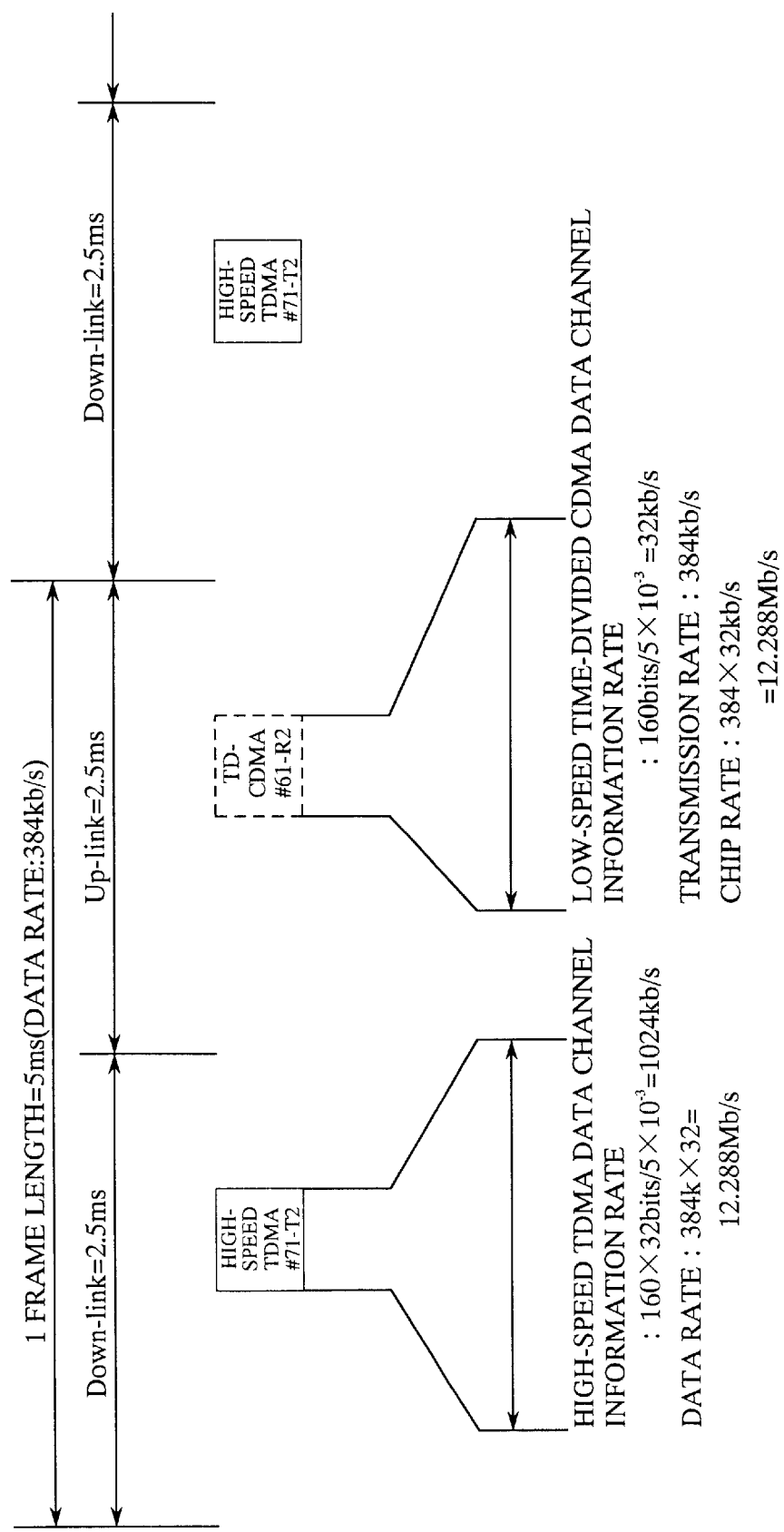
FIG. 4 shows an illustrative drawing showing an example of an asymmetric data communication channel being composed of a high speed TDMA data channel and a time divided CDMA channel shown in FIG. 3 in the embodiment 1.

FIG. 4 is an illustrative drawing showing an example of an asymmetric data communication channel composed of a high-speed TDMA data channel and a time-divided CDMA channel shown in FIG. 3 in a TDD system. According to the example shown in FIG. 4, one frame length is 5 ms and a half-frame length of 2.5 ms is assigned to the down-link and the same is assigned to the up-link. The down-link is a high-speed TDMA data channel and the information transmission rate is 1.024 Mb/s. The up-link is a low-speed time divided CDMA data channel and the information transmission rate is 32 kb/s.

In the above explanation, an asymmetric channel is shown in which the down-link from a base station to a mobile station is a high-speed TDMA data channel and the up-link from the mobile station to the base station is a low-speed time divided CDMA data channel; however another asymmetric channel is also possible which is composed of a down-link of a high-speed TDMA data channel and a up-channel of a low-speed TDMA data channel.

Besides the above-mentioned asymmetric channels, an asymmetric channel composed of a down-link of a low-speed data channel and an up-link of a high-speed TDMA data channel, or another asymmetric channel composed of a down-link of a low-speed time-divided CDMA data channel and an up-link of a high-speed TDMA data channel are also possible.

In the case of the mobile communication system in the embodiment 1 as explained in the above, if the system is a TDD system, the ratio of the total information quantity in down-links transmitted from the base station to the total information quantity in up-links received by the base station may be varied by shifting the TDD line 77 or 78 in the direction of the time axis, the TDD line which is shown in the chart defined by the frame time axis and the frequency axis as shown in FIG. 3 and forms the border between the down-links and the up-links.

The management of the asymmetric communication channel is performed by mobile switching centers 6 and 7, and the change in the ratio of information quantity in the up-link to that in the down-link is instructed by the mobile switching center 6 or 7 to at least one base station 1, 3 or 2.

As explained in the above, according to the embodiment 1, by organizing the systems, (a low-speed TDMA system being commonly used by low-speed data communication and voice frequency communication, a time divided CDMA system being commonly used by low-speed data communication and voice-frequency communication, and a high-speed TDMA system for high-speed data communication), into one system, the switching over of communication speed in the unit of a frame length (5 ms in the example shown in FIG. 4) required by users may be realized, and also by adopting different systems for the down-link and the up-link from each other, that is, by setting an asymmetric communication channel, a mobile communication system is realized which is able to flexibly respond to changes in communication capacity, which makes the system suitable for use with multimedia.

In the above description, a case where a high-speed TDMA data channel is used as a high-speed data channel for transmitting a large quantity of data was shown, however, as a high-speed data channel a high-speed time divided CDMA data channel, and so on may be used and the same effect as that obtained in the embodiment 1 is obtained.

Embodiment 2

In the following, the control process of a mobile communication system having an asymmetric channel shown in the embodiment 1 will be explained as an embodiment 2.

Figure 5:
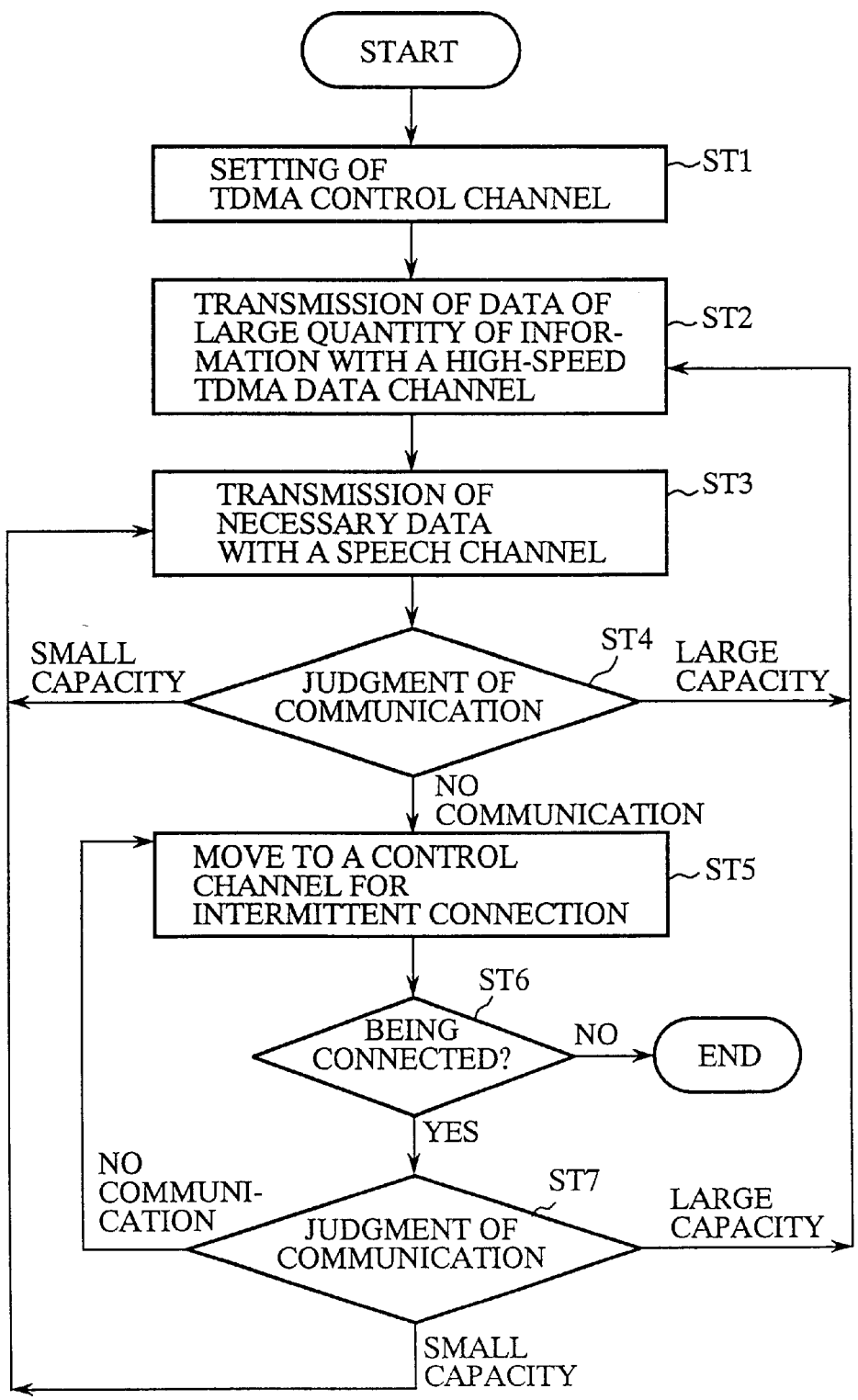
FIG. 5 shows a flow chart showing a control process of a system having an asymmetric channel in an embodiment 2 according to the present invention.

FIG. 5 shows a flow chart showing the control process in a mobile communication system having an asymmetric channel in the embodiment 2 according to the present invention. In a mobile station when power is made on and the access to a mobile communication system is started, in step ST1, a TDMA control channel is set between a mobile station and a base station to communicate control data necessary for the communication between them. In other words, the mobile station receives control data from the subject base station through the TDMA control channel and transmits a signal to the designated time slot through a up-link TDMA control channel. The position of a received burst is measured in the base station, and the deviation information from the designated position of the time slot is transmitted to the mobile station, and the burst position in the up-link is corrected based on the deviation information. Thus the synchronization is established. At the same time, information concerning channel setting is also exchanged.

When the setting of the TDMA control channel is finished, in the step ST2, a large quantity of data is transmitted from the base station to the mobile station through the high-speed TDMA data channel. In this case, the up-link and the down-link do not form an equal duplex operation system as in an ordinary telephone system, and in step ST2, only in the down-link a large quantity of data is transmitted from the base station to the mobile station through the high-speed TDMA data channel. While the data are being transmitted in the down-link, in the up-link, the information of the quantity of the same order as in the case of an ordinary voice frequency digital signal may be transmitted. In this case, a time divided CDMA channel or a low-speed TDMA data channel is used for the up-link. In this way, in the down-link a large quantity of data is transmitted and in the up-link a small quantity of data is transmitted, thus an imbalance in the transmission capacity between the up-link and the down-link occurs, which produces asymmetry in the channel.

In a step ST3, after the transmission of a large quantity of data in the down-link in step ST2 is finished until the transmission of a large quantity of data is started in the up-link, the base station and the mobile station are kept being connected with a data transmission channel of a small data transmission capacity. In other words, when the transmission of a large quantity of TDMA data is finished, the connection between the base station and the mobile station is continued using a time divided CDMA channel as a up-link and using a corresponding time divided CDMA channel for the down-link, and necessary data may be exchanged. In the drawing, an example is shown in which the base station and the mobile station are connected with a time divided CDMA channel, however a low-speed TDMA data channel may be also used.

As mentioned in the above, for example, in the case where a user in a mobile station (multimedia terminal) receives a large quantity of image data through the high-speed TDMA data channel and the image is displayed on the screen of the multimedia terminal, and the response concerning the contents of the image is required, it unlikely that the user would be able to give a response immediately as it would require the transmission of a large quantity of data. Thus a period of time of consideration is needed for the user. However the period of time for the response will not be given, so that, in most cases, an immediate request to set an up-link does not occur. In the step ST3, during a period of time until the transmission of a large quantity of data to the up-link, the base station and the mobile station are connected with a data transmission channel of a small capacity, a time divided CDMA channel for example.

Next in step ST4, it is judged that whether communication is executed or not, and if it is, it is also judged whether communication is being executed with a large quantity of data or not. As a result, if communication is executed by the transmission of a small quantity of data, the process is brought back to step ST3 and transmission of small quantity of data, that is, the communication through the time divided CDMA channel is continued. Otherwise if the communication is executed by the transmission of a large quantity of data, the process is brought back to step ST2, and data transmission of a large information quantity through a high-speed TDMA data channel is resumed.

On the other hand, if it is judged that there is no communication, the process is advanced to step ST5 and if there is no communication for a further predetermined time (one minute, for example) the connection between the mobile station and the base station is moved to a control channel for connection composed of a time divided CDMA control channel or a low-speed TDMA control channel for intermittent connection (hereinafter referred to as a control information channel for intermittent connection) which transmits only control data in both up-link and down-link. It may be considered that there is no data being transmitted practically (except control data for connection) in both up-link and down-link in a case such as a period of time while a user is under consideration. The control information channel for intermittent connection is set in the case as mentioned in the above. The control information channel for intermittent connection will be explained in detail in the next embodiment 3.

In the case of a control information channel for intermittent connection shown in step ST5, the communication of control data between a base station and a mobile station is executed once in one multi-frame (for example, 40 frames are made to be one multi-frame) through a time divided CDMA control channel. Therefore, by one channel of the time divided CDMA control channel 40 mobile stations may be kept in a state of being connected (however, transmission of information data is suspended).

Next in the step ST6, it is judged whether a mobile station and a base station are connected or not, and if they are not connected, the series of processes are finished. On the other hand, if they are being connected, the same judgment as that in step ST4 is performed in step ST7. In the result, in a case where it is judged that there is no communication, the process is brought back to step ST5 and the connection with a control information channel for intermittent connection is continued. On the other hand, in a case where it is judged that the communication is executed by the transmission of a small quantity of data, the process is brought back to step ST3 and the communication is executed through a time divided CDMA channel, and in a case where it is judged that the communication is executed by the transmission of a large quantity of data, the process is brought back to step ST2 and the transmission of a large information quantity of data through a high-speed TDMA data channel is resumed.

The management of switching of the asymmetric channels is performed by mobile switching centers 6 and 7. The instruction for switching from a data transmission channel for a large quantity of data (high-speed TDMA data channel) to a data transmission channel for a small quantity of data (time divided CDMA channel or low-speed TDMA channel), from a data transmission channel for a small quantity of data to a control information channel for intermittent connection or to a data transmission channel for a large quantity of data, or further from a control information channel for intermittent connection to a data transmission channel for a large quantity of data or to a data transmission channel for a small quantity of data is given from the mobile switching center 6 or 7 to at lease one base station 1, 3 or 2.

As mentioned in the above, according to the embodiment 2, there is a merit that the useless occupation of a communication channel of large transmission capacity in a period of time when data are not actually transmitted may be avoided by switching the data transmission channel of a large transmission capacity to another channel having different transmission capacity right after the finish of transmission of a large quantity of data.

Embodiment 3

The constitution of a control information channel for intermittent connection used as a control channel for connection described in the embodiment 2 will be explained as an embodiment 3 according to the present invention.

Figure 6:
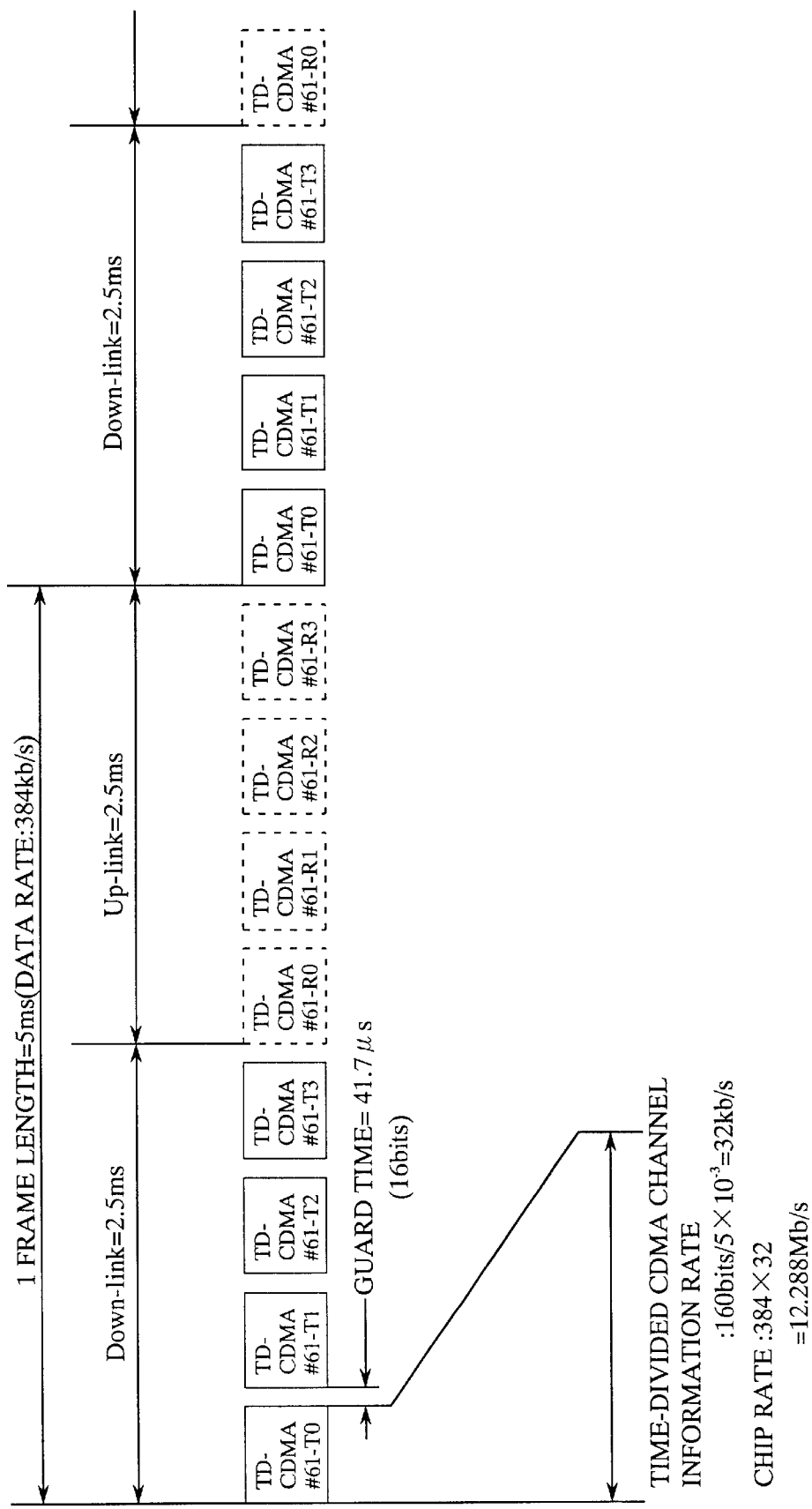
FIG. 6 shows an illustrative drawing showing the constitution of a time divided CDMA burst for PCS in an embodiment 3 according to the present invention.
Figure 7:
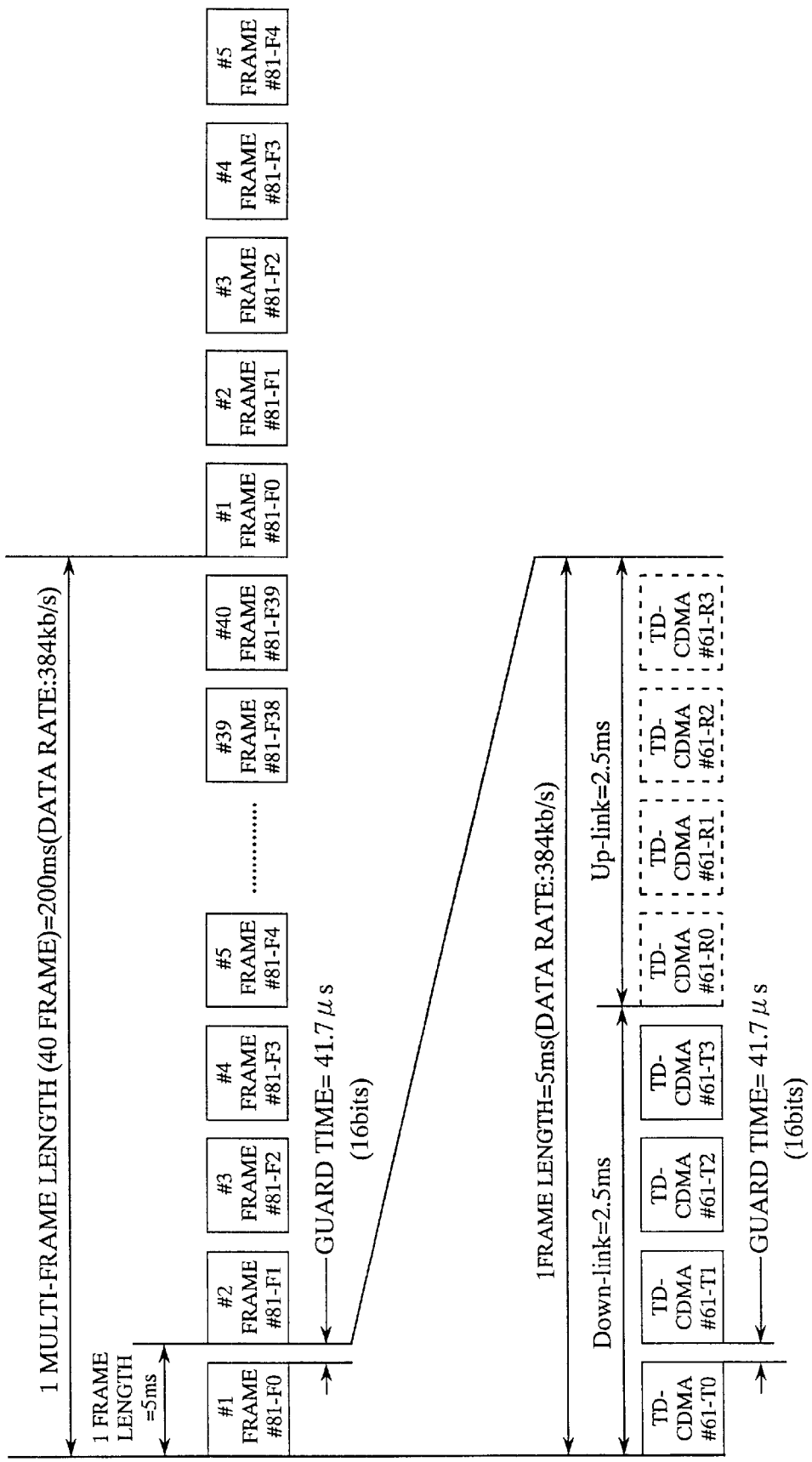
FIG. 7 shows an illustrative drawing showing a multi-frame constitution of a time divided CDMA burst for PCS in the embodiment 3.
Figure 8:
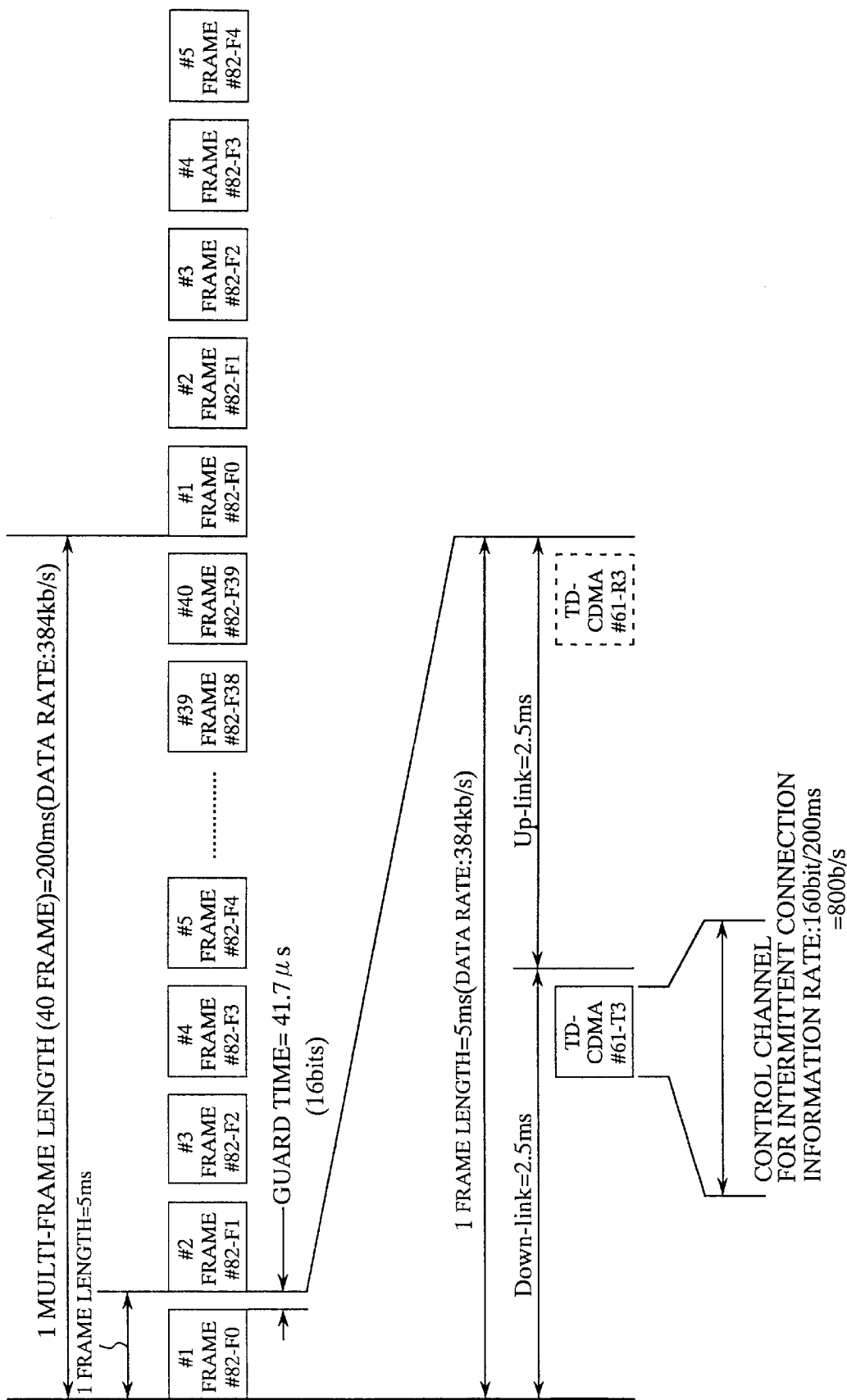
FIG. 8 shows an illustrative drawing showing the constitution of an intermittent connection control channel in a multi-frame of a time divided CDMA burst for PCS in the embodiment 3.

FIG. 6 shows an illustrative drawing showing the structure of a CDMA burst for PCS in the embodiment 3 according to the present invention which shows an example of numerical values corresponding to a part of the time divided CDMA shown in FIG. 3. FIG. 7 shows an illustrative drawing showing multi-frame constitution of a time divided CDMA burst for PCS in the embodiment 3 which shows an example of numerical values corresponding to time divided CDMA frames shown in FIG. 6. FIG. 8 shows an illustrative drawing showing the constitution of a control information channel for intermittent connection in a multi-frame of a time divided CDMA burst for PCS in the embodiment 3, and an example of numerical values corresponding to a time divided CDMA multi-frame is shown in FIG. 7.

The above-mentioned FIG. 6 shows an example of a time divided CDMA channel, and it is possible to assign 32 telephone channels of 32 kb/s at the maximum by code split technics to the time slot #61-0 for the time divided CDMA. In one of the 32 telephone channels is used once in a multi-frame (in the example shown in FIG. 7, 1 multi-frame is composed of 40 frames) as shown in FIG. 7, 40 control information channels for intermittent connection of an information rate of 800 b/s may be formed. The control information channels for intermittent connection are formed with a data transmission channel for a small quantity of data having an up-link and a down-link of the same information transmission capacity. In a mobile station having 40 users, the control information channel for intermittent connection may be used as a connection channel while data transmission of a large information quantity is suspended.

At a multimedia terminal of a mobile station, considerable time will be needed until a user finishes processing a large quantity of received information or after the reception of image data of a large information quantity until the image is displayed on a screen and processing is finished. When there is no need to transmit a large quantity of data at a given moment, if a control information channel for intermittent connection is connected between the mobile station and the base station it is easy to resume transmission of any information data of a large or small quantity.

As mentioned in the above, the control information channel for intermittent connection is a method of transmission utilizing a multi-frame system, and because of its very small capacity, an operator (A communication company, an owner of a communication system for offering communication services, is generally called an operator.) might be able to offer a service in which a user is able to use the channel free of charge, and such a service may be considered reasonable by users. While the control information channel for intermittent connection is operated, the user is under consideration, however, the user's terminal is kept being connected with a database or an offerer of information, that is, the user is not in a state where he has finished his work cutting off power supply.

A period of time until the process of a large quantity of data received by the user is finished, that is, a period of time while the user of the multimedia system is under consideration, it is also good to transmit control data showing that data are not being transmitted through the control information channel for intermittent connection.

The management of the control information channel for intermittent connection is performed by the mobile switching center, 6 or 7, and the starting, switching or suspension of the control information channel for intermittent connection is instructed by the mobile switching center 6 or 7, to at least one of the base stations 1, 3 or 2.

As mentioned in the above, according to the embodiment 3, the advantage is obtained that adverse influences upon the depth or length of consideration of a user caused by hardware may be avoided by connecting the user and a database offerer or the like with a minimum control data channel during a period of time spent for the judgment of the user based on the information displayed on the display unit of a multimedia terminal of a mobile station by transmitting control data using a control information channel for intermittent connection utilizing a multi-frame. If an operator offers such a service that during the use of a control information channel for intermittent connection which transmits a minimum control data no charge is collected, the above-mentioned merit will be further effective.

Embodiment 4

Next, as an embodiment 4 according to the present invention, the constitution of a high-speed TDMA data channel as a high-speed data channel will be explained.

Figure 9:
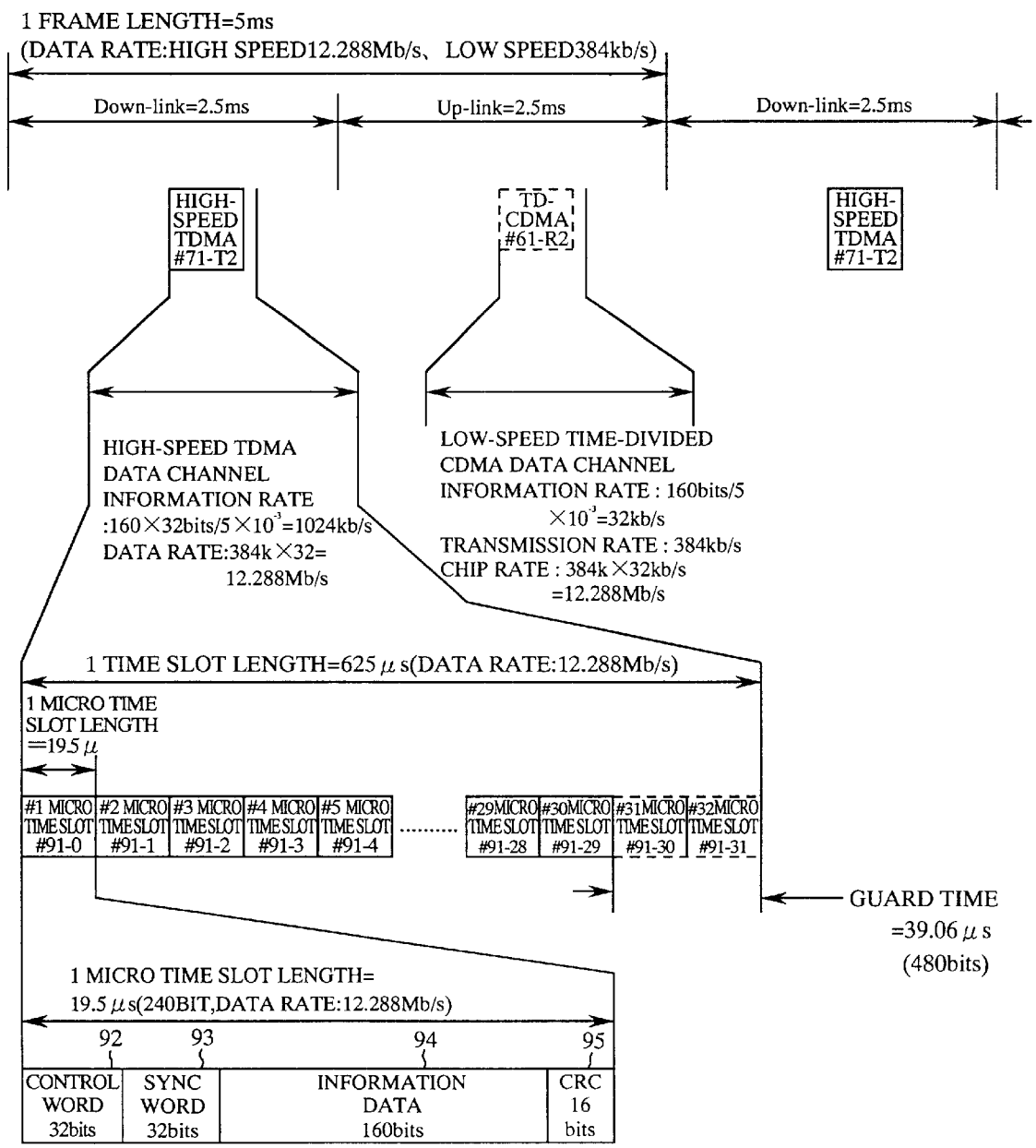
FIG. 9 shows an illustrative drawing showing the constitution of a micro time slot in a high speed TDMA data channel in an embodiment 4 according to the present invention.

FIG. 9 shows an illustrative drawing showing the constitution of a micro time slot in a high-speed TDMA data channel in an embodiment 4 according to the present invention, and the drawing shows the constitution of a high-speed TDMA data channel #71 shown in FIG. 3 and FIG. 4 further in detail.

In one frame having a length of 5 ms shown in FIG. 3, there is a time space for 10 time slots of high-speed data channels for a down-link and an up-link, #71-T0 to #71-T3, #71-T7A, #71-T7B and #71-T7C, and #71-R0 to #71-R2, and in FIG. 9, the constitution of one time slot, #71-T2 for high-speed data is shown out of the ones shown in the above. The length in time of the high-speed data time slot is 625 $\mu$sec and the data rate (bit rate) is 12.288 Mb/s. Therefore, a number of bits in a high-speed data time slot is 625 $\mu$s×12.288 Mb/s=7680 bits=240×32 bits. Thereby, it is understood that a high-speed data time slot is composed of 32 micro time slots of 240 bits connected in series. A micro time slot constituted with 240 bits has the same constitution as that of 1 time slot of a low-speed TDMA data channel. As shown in the above, a high-speed TDMA data channel is composed of 32 micro time slots, #91-0 to #91-31, and each of them has the same constitution as that of one time slot in a low-speed TDMA data channel and is composed of a control word 92 of 32 bits, a sync word 93 of 32 bits, information data 94 of 160 bits and a correction code 95 (CRC) of 16 bits.

In the constitution of a micro time slot in a high-speed TDMA data channel shown in FIG. 9, micro time slots, #91-30 and #91-31, are shown by broken lines, which shows that these two micro time slots, #91-30 and #91-31, make a guard time in a high-speed TDMA data channel. The guard time is set in proportion to the moving speed of a user, and in the case of movement in the order of a walking speed, 2 micro time slots are good enough. For a user who moves by car, about 5 micro time slots are needed.

The arrangement to vary the length of a guard time corresponding to the moving speed of a user, and to store the data of the guard time in a memory or the like in the mobile switching center 6 or 7, as user's data, and to vary the frame constitution according to the user's data, is effective from the point of view of transmission efficiency.

In the above description, it is shown that the constitution of a high-speed TDMA data channel is composed of a plurality of channels of a low-speed TDMA data channel connected in series, and it is also good to constitute the high-speed TDMA data channel with a plurality of channels of a time divided CDMA channel for low-speed data transmission connected in series.

A synch word 93 in the schematic drawing of a micro time slot (240 bits) shown in FIG. 9 is a training sequence of equalizers to remove delay transmission distortion caused by a plurality of transmission paths. The sync word 93 is provided once for 240 bits, so that in a high-speed TDMA data channel training is executed 30 times. A high-speed TDMA data channel shown in FIG. 9 as an example is equivalent to 32 low-speed TDMA data channels connected in series, so that a high-speed equalizer for a high-speed TDMA data channel is the same as a low-speed equalizer for a low-speed TDMA data channel except the operation speed of 32 times quick, and this fact also shows that the embodiment 4 is effective.

The management of the constitution of a micro time slot is performed by the mobile switching center 6 or 7, and an instruction of change concerning the constitution of a micro time slot including the length of guard time is given from the mobile switching center 6 or 7, to at least one base station 1, 3 or 2.

As mentioned in the above, according to the embodiment 4, a high-speed TDMA data channel is constituted with a plurality of low-speed TDMA data channels or time divided CDMA channels for low-speed data transmission connected in series, so that they have the same constitution except the system low-speed processing unit and the speed. Thereby, there is an effect that the whole constitution is simplified, which decreases the costs of design and equipment.

It is made possible to increase or decrease a guard time in the unit of a micro time slot, therefore, there is a merit that a proper guard time may be set for a high-speed moving body, a low-speed moving body or a semi-fixed moving body, which prevents interference from another channel and at the same time prevents lowered efficiency.

Embodiment 5

In the following the constitution of a mobile station and a base station to realize an asymmetric channel including the data transmission by a low-speed TDMA channel, a time divided CDMA channel, and a high-speed TDMA channel will be explained as an embodiment 5 according to the present invention.

Figure 10:
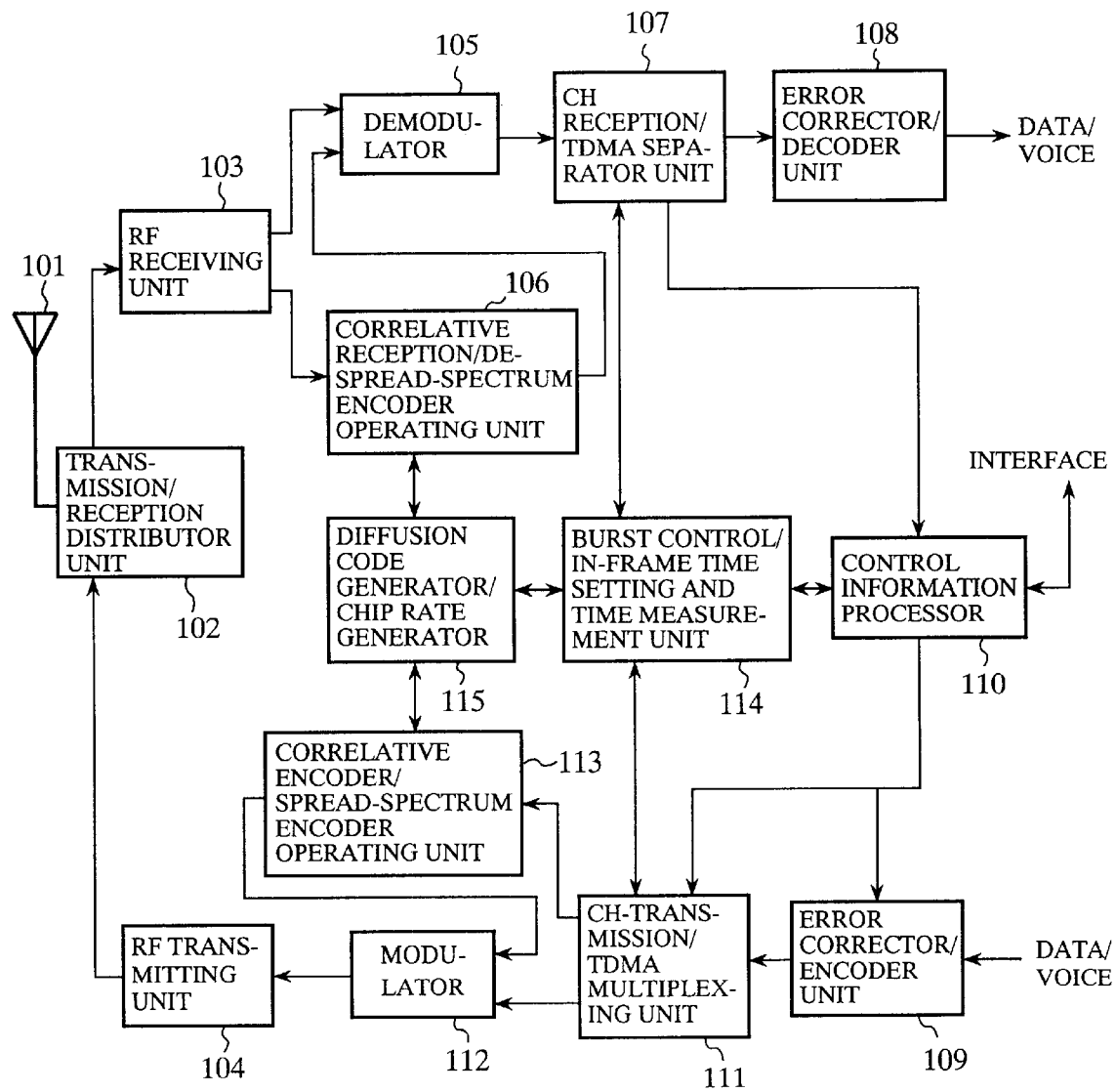
FIG. 10 shows a block diagram showing the constitution of a mobile station in an embodiment 5 according to the present invention.

FIG. 10 shows a block diagram showing the constitution of a mobile station in the embodiment 5 according to the present invention. In the drawing, a reference numeral 101 denotes an antenna, 102 denotes a transmission/reception distributor unit which performs distribution of signals received by the antenna 101 and signals to be transmitted from the antenna 101, 103 denotes an RF (radio frequency) receiving unit which amplifies a signal received by the antenna 101, and 104 denotes an RF transmitting unit which amplifies a signal to be transmitted from the antenna 101. The RF receiving unit 103 comprises a built-in switch for selecting a transmission system, that is, for selecting a communication system which is able to transmit a necessary quantity of information in synchronizing with time slots, and the output is changed over corresponding to a selected communication system.

A reference numeral 105 denotes a demodulator which comprises high-speed and low-speed equalizers to remove delay transmission distortion caused by transmission channels, and demodulates a signal which is selected and output by the RF receiving unit 103 in a case where a low-speed TDMA channel or a high-speed TDMA channel is utilized. A reference numeral 106 denotes a correlative reception/despread-spectrum encoder operating unit which multiplies a signal selected and output by the RF receiving unit 103 and a spread-spectrum code assigned to the own station (despread-spectrum decoding operation) and extracts the original signal which is not subjected to spread-spectrum encoding (correlating reception) and outputs the signal to the demodulator 105. A reference numeral 107 denotes a channel reception/TDMA separator unit (hereinafter referred to as CH reception/TDMA separator unit) which extracts a necessary signal from the format of a demodulated signal by the demodulator 105 (multiple separation) and supplies the signal to the processing unit of the signal.

A reference numeral 108 denotes an error corrector/decoder unit which corrects an error or errors in the information supplied from the CH reception/TDMA demodulator unit 107, and decodes high-speed data or a voice-frequency signal extracted from the information and supplies them to a man-machine interface which is not shown in a drawing. A reference numeral 109 denotes an error corrector/voice frequency signal encoder unit which encodes high-speed data or a voice frequency signal supplied from the man-machine interface, and add a code for error correction to it. A reference numeral 110 denotes a control information processor which decodes the control data separated in the CH reception/TDMA separator unit 107, and instructs various functions based on the decoded data to a mobile station concerned and creates control data of response for them.

A reference numeral 111 denotes a channel transmission/TDMA multiplexing unit (hereinafter referred to as CH transmission/TDMA multiplexing unit) which multiplexes high-speed data or a voice frequency signal encoded with an error correction code and a control data from the control information processor 110, and incorporates the multiplexed information into a necessary time slot in a frame format and outputs it. The CH transmission/TDMA multiplexing unit 111 comprises a built-in switch for selecting a system for transmission, that is, for selecting a communication system which is able to transmit a necessary information quantity in synchronizing with time slots, and the output of the switch is changed over corresponding to a communication system. A reference numeral 112 denotes a modulator which modulates the information output from the CH transmission/TDMA multiplexing unit 111 and outputs it to the RF transmitting unit 104 in a case where a low-speed TDMA channel or a high-speed TDMA channel is utilized. A reference numeral 113 denotes a correlative encoder/spread-spectrum encoder operating unit, and when a time-divided CDMA channel is utilized, it spectrum-spreads and encodes the information output from the CH transmission/TDMA multiplexing unit 111 on the frequency axis utilizing a spread-spectrum code assigned to the own station, and outputs the encoded information to the modulator 112.

A reference numeral 114 denotes a burst control/in-frame time setting/time measurement unit which performs the control of radiation time of a radio burst radiated from the own station, time setting in a frame for setting a time slot in which a radio wave is to be radiated, and time measurement for setting transmission timing of the radio burst. A reference numeral 115 denotes a spread-spectrum code generator/chip rate generator which generates chip rate to be used for time measurement in the burst control/time setting in a frame and time measurement unit 114, and a spread-spectrum code assigned to the own station.

Next, the explanation concerning the operation of a mobile station constituted as mentioned in the above.

A mobile station shown in FIG. 10 realizes an asymmetric channel, and a case will be herein considered where a high-speed TDMA data channel for transmitting a large quantity of information data is set for a down-link and a time-divided CDMA channel as transmitting a small quantity of data is set as an up-link.

A radio wave carrying a high-speed TDMA data channel radiated from a base station is received with the antenna 101, and the received signal is input to the RF receiving unit through the transmission/reception distributor unit 102. Since the received signal is transmitted through the high-speed TDMA data channel, the signal is directly sent to the demodulator 105 having equalizers by the function of the built-in switch. The demodulator 105 demodulates the signal from the RF receiving unit and outputs a digital signal. The digital signal demodulated in the demodulator 105 is input to the CH-reception/TDMA separator unit 107, and separated into high-speed data information and control data. The separated control signal is sent to the control information processor 110 and the high-speed data information is sent to the error-corrector/demodulator unit 108. In the error-corrector/demodulator unit 108, after the correction of an error or errors in the high-speed data information, the data are decoded and transferred to the man-machine interface.

The low-speed data from the man-machine interface unit are digitized in the error-corrector/encoder unit 109, and the data are sent to the CH-reception/TDMA multiplexing unit 111 being added with an error-correction code. The CH-reception/TDMA multiplexing unit 111 multiplexes the low-speed data information from the error-corrector/encoder unit 109 and the control data from the control information processor 110, and incorporates them into a predetermined time slot, and the incorporated data are output according to the control by the burst-control/time setting in a frame and time measurement unit 114. When low-speed data information is transmitted through a time-divided CDMA channel, the multiplexed signal in the CH-transmission/TDMA multiplexing unit 111 is output to the correlative encoder/spread-spectrum encoder operating unit 113 by the switching of the built-in switch. In the correlative encoder/spread-spectrum encoder operating unit 113, the multiplexed signal from the CH-transmission/TDMA multiplexing unit 111 is CDMA-encoded and after that the signal is sent to the modulator 112 to be modulated. The signal modulated in the modulator 112 is sent to the antenna 101 through the RF transmitting unit 104 and the transmission/reception distributor unit 102, and then it is transmitted to the base station.

Next, a case will be considered where a time-divided CDMA channel for transmitting low-speed data is set for a down-link and a high-speed TDMA data channel for transmitting data of a large information quantity is set for an up-link.

A radio signal in the time-divided CDMA data channel received by the antenna 101 is sent to the RF receiving unit 103 through the transmission/reception distributor unit 102 and input to the correlative reception/despread-spectrum encoder operating unit 106 by the selection of the built-in switch in the RF receiving unit 103 and received correlatively. The output of the correlative reception/despread-spectrum encoder operating unit 106 is converted into a digital signal by the demodulator 105 having equalizers, and it is separated into low-speed data information and control data by the CH-reception/TDMA separator unit 107. The control data are sent to the control information processor 110, and the low-speed data information is sent to the error corrector/decoder unit 108. The error corrector/decoder unit 108 corrects an error or errors in the low-speed data information and decodes the data, and transfers them to the man-machine interface.

The high-speed data from the man-machine interface unit are encoded in the error corrector/encoder unit 109, and added with an error correction code, and then the data are multiplexed with the control data from the control information processor in the CH-transmission/TDMA multiplexing unit 111. The multiplexed signal is sent to the modulator 112 by the selection of the built-in switch in the CH-transmission/TDMA multiplexing unit 111, and the signal is modulated in the modulator 112, and sent to the antenna 101 through the RF transmitting unit 104 and transmission/reception distributor unit 102, and then the signal is transmitted from the antenna 101 to the base station.

A mobile station shown in FIG. 10 is able to correspond to a plurality of symmetric communication channels, such as the cases where both down-link and up-link are assigned a high-speed data channel, both down-link and up-link are assigned a low-speed TDMA data channel, both down-link and up-link are assigned a low-speed time-divided CDMA data channel, however, the explanation concerning the above will be omitted.

Figure 11:
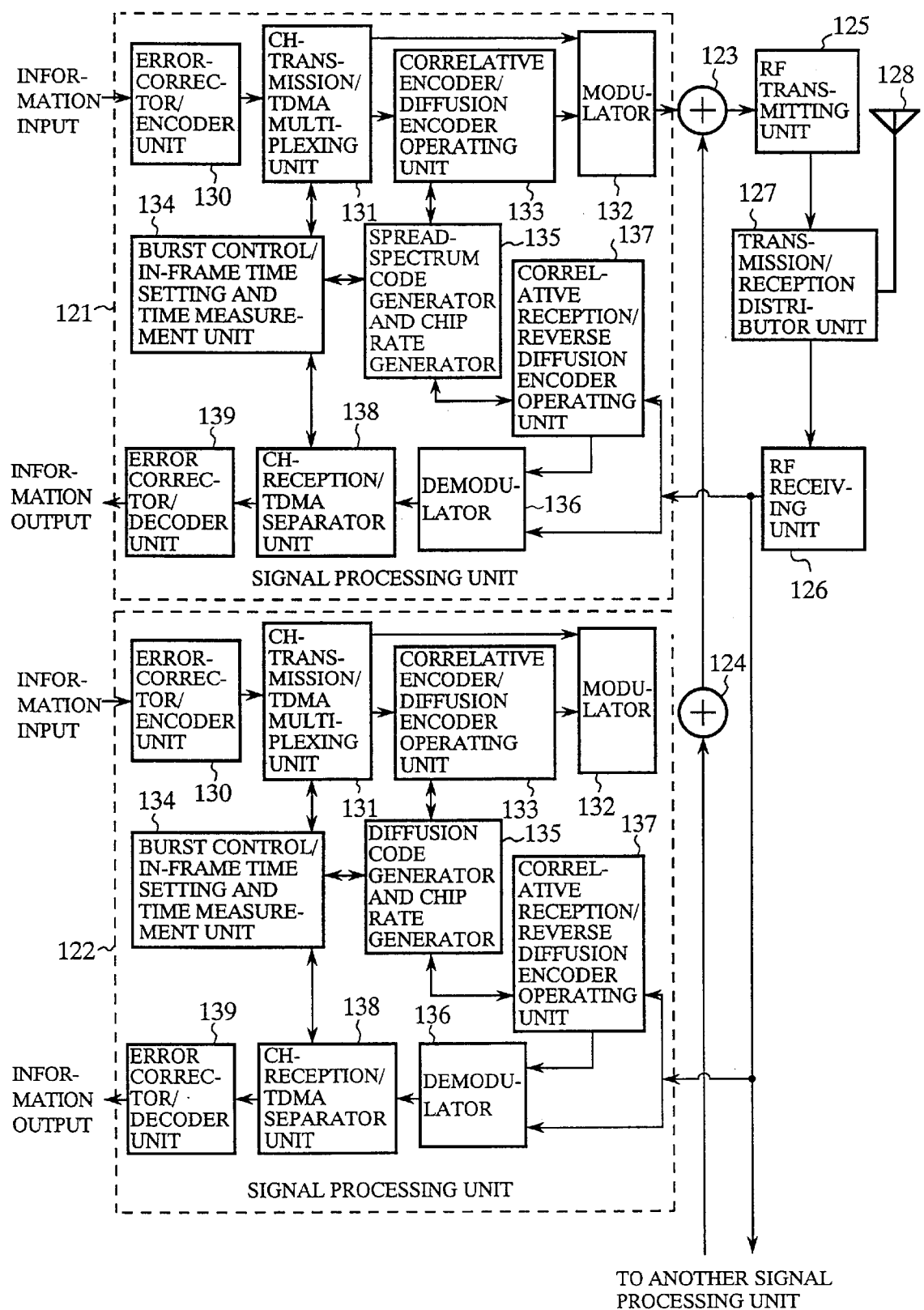
FIG. 11 shows a block diagram showing the constitution of a base station in the embodiment 5.

FIG. 11 shows a block diagram showing the constitution of a base station in the embodiment 5 according to the present invention. In the drawing, reference numerals 121 and 122, denote signal processing units which comprise an equivalent function with the mobile station shown in FIG. 10 eliminating the antenna 101, transmission/reception distributor unit 102, RF receiving unit 103, and RF transmitting unit 104.

Reference numerals 123 and 124, denote adders which make addition of signals output from a plurality of signal processing units including the above-mentioned signal processing units 121 and 122. A reference numeral 125 denotes an RF transmitting unit, 126 denotes an RF receiving unit, 127 denotes a transmission/reception distributor unit, and 128 denotes an antenna.

In the signal processing units 121 and 122, a reference numeral 130 denotes an error-corrector/encoder unit, 131 denotes a CH-transmission/TDMA multiplexing unit, 132 denotes a modulator, 133 denotes a correlative encoder/spread-spectrum encoder operating unit, 134 denotes a burst control/in-frame time setting/time measurement unit, 135 denotes a spread-spectrum code generator and chip rate generator, 136 denotes a demodulator, 137 denotes a correlative reception/despread-spectrum decoder operating unit, 138 denotes a CH-reception/TDMA separator unit, and 139 denotes an error corrector/decoder unit, and these are equivalent to corresponding parts shown in FIG. 10.

Next, the operation of a base station constituted as mentioned in the above will be explained in the following.

A base station shown in FIG. 11 is able to correspond to both asymmetric communication channel or symmetric communication channel, and the operation of the signal processing units 121 and 122, is the same as that of the mobile station shown in FIG. 10. However, the output signal of a modulator 132 is an intermediate frequency (IF) signal modulated by an information signal. Therefore, the center frequencies of output signals of respective modulators 132 or the band width of modulated signals in the signal processing units 121 and 122, and further the constitution of a time slot in a frame are extremely diverse as shown in FIG. 2 or FIG. 3.

A signal output from the modulator 132 in the signal processing units 121 and 122 is added to a signal output from the other signal processing unit and supplied to the RF transmitting unit 125 and further sent to the antenna 128 through the transmission/reception distributor unit 127 and transmitted from the antenna. The signal received with the antenna 128 is sent to the RF receiving unit 126 through the transmission/reception distributor unit 127, and the signal from the RF receiving unit 126 is input to the demodulator 136 or to the correlative reception/despread-spectrum encoder operating unit 137.

Figure 12:
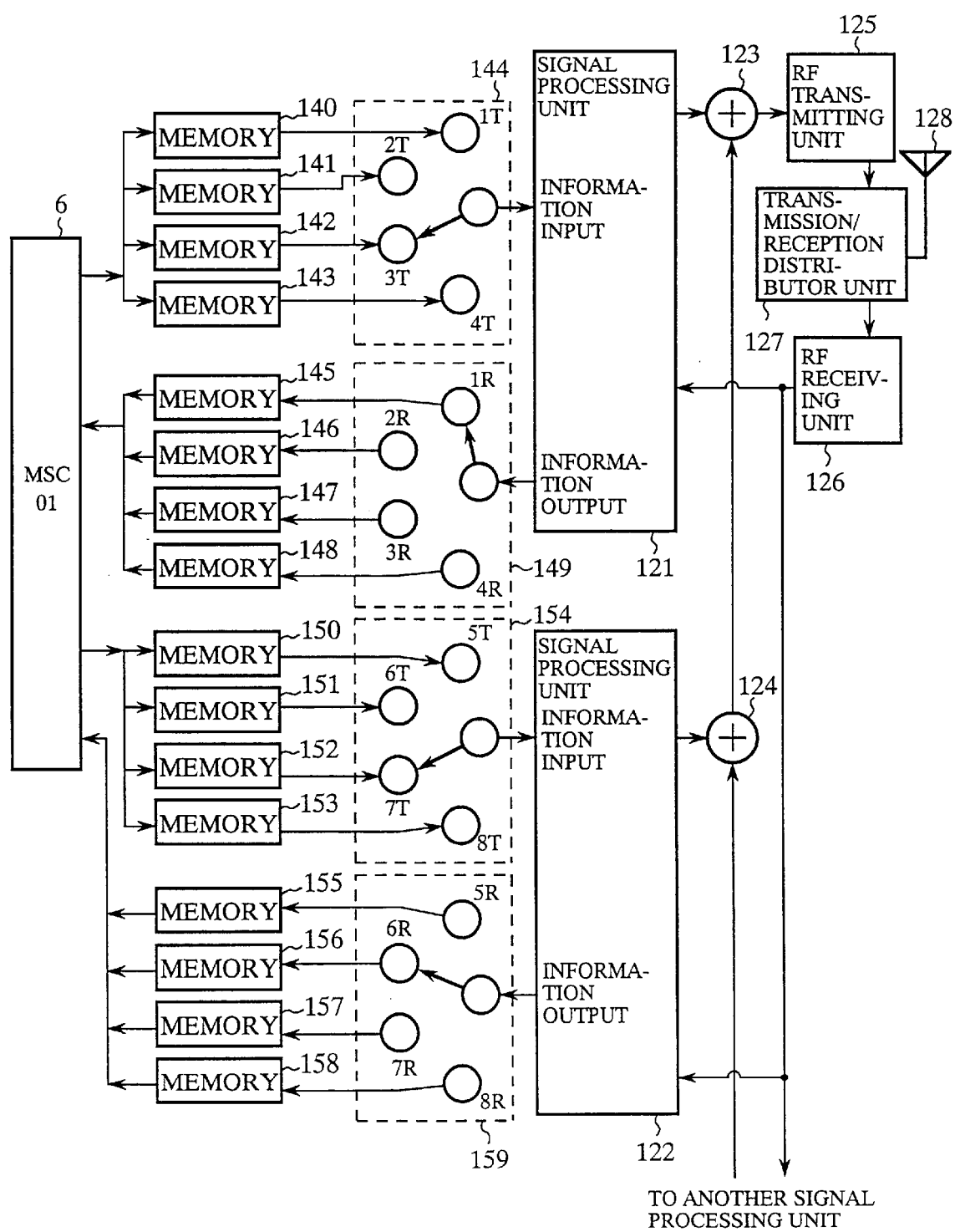
FIG. 12 shows a block diagram showing an interface unit on the side of a mobile switching center in a base station in the embodiment 5.

In the signal processing units 121 and 122, the exchange of information signals is performed with a mobile switching center (MSC01) 6, not with the man-machine interface. FIG. 12 shows a block diagram showing the outline of an interface unit of the base station to be connected to the mobile switching center 6.

In the drawing, a reference numeral 140 denotes a memory for converting a time-divided CDMA channel, 141 denotes a memory for converting a low-speed TDMA data channel, 142 denotes a memory for converting a high-speed TDMA data channel, and 143 denotes a memory for converting a TDMA/time-divided CDMA control channel. A reference numeral 144 denotes a switch which selects a memory out of the memories 140 to 143, for channel assignment and connects it to the input of the signal processing unit 121, and also selects a transmission system, that is, a communication system which is able to transmit necessary information quantity in synchronization with time slots. A reference numeral 145 denotes a memory for converting a time-divided CDMA channel, 146 denotes a memory for converting a low-speed TDMA data channel, 147 denotes a memory for converting a high-speed TDMA data channel, 148 denotes a memory for converting a TDMA/time-divided CDMA control channel, and 149 denotes a communication system selection switch which connects a memory selected out of the memories 144 to 148, to the information input of the signal processing unit 121.

A reference numeral 150 denotes a memory for converting a time-divided CDMA channel, 151 denotes a memory for converting a low-speed TDMA data channel, 152 denotes a memory for converting a high-speed TDMA data channel, 153 denotes a memory for converting a TDMA/time-divided CDMA control channel, and 154 denotes a switch for communication system selection which selects a memory out of memories 150 to 153, and connects it to the information input of the signal processing unit 122. A reference numeral 155 denotes a memory for converting a time-divided CDMA channel, 156 denotes a memory for converting a low-speed TDMA data channel, 157 denotes a memory for converting a high-speed TDMA data channel, 158 denotes a memory for converting a TDMA/time-divided CDMA control channel, and 159 denotes a switch for communication system selection which selects a memory out of memories 154 to 158, and connects it to the information input of the signal processing unit 122. The direction of channel conversion by the memories 140 to 143, and 150 to 153, is in an opposite direction to that of channel conversion by the memories 145 to 148, and 154 to 158.

The other parts are denoted with the same reference numerals as corresponding parts shown in FIG. 11, so that their explanation is omitted.

In FIG. 12, four switches for communication system selection 144, 149, 154 and 159 are shown, and FIG. 13 shows an illustrative drawing showing the assignment of time slots to these switches 144, 149, 154, and 159 for communication selection in the form of a table. In the following, the actions of these switches will be explained referring to FIG. 13.

The switch 144 is able to select three kinds of communication systems and a control channel. According to the selection timing of the switch 144 shown in FIG. 13, in the transmitting time slot $T_0$ shown in FIG. 3, the switch 144 selects 4T, that is, a control channel #62-T0 of the TDMA system. Therefore, during the transmitting time slot $T_0$ the memory 143 is connected to the information input of the signal processing unit 121 and a control channel is connected to the output of the signal processing unit 121.

In the transmitting time slot $T_1$ shown in FIG. 3, the switch 144 selects 1T, that is, time-divided CDMA channel #61-T1, and during the transmitting slot $T_1$ the memory 140 is connected to the information input of the signal processing unit 121. Therefore, a speech channel in the time divided CDMA channel is subjected to frequency spread-spectrum by a spread-spectrum code which is characteristic of the speech channel, in the signal processing unit 121, and it is output being encoded with orthogonal coding. In the same way, in the transmitting time slots, $T_2$ and $T_3$, the high-speed TDMA data channel #71-T2 and #71-T3 are selected.

According to the timing selection of the switch 149 shown in FIG. 13, in the receiving time slot $R_0$ shown in FIG. 3, 4R, that is, a control channel #62-R0 of the TDMA system is selected by the switch 149. Therefore, during the receiving time slot $R_0$ the memory 148 is connected to the information output of the signal processing unit 121, and control information transmitted from the mobile station to the base station is output to the mobile switching center 6 on the side of the network from the signal processing unit 121. In the receiving time slot $R_1$, the switch 149 selects 1R, that is, time divided CDMA channel #61-R1, and the memory 145 is connected to the information input of the signal processing unit 121. Therefore, a speech channel signal in the time divided CDMA channel transmitted from the mobile station to the base station is correlatively detected with a spread-spectrum code characteristic of the speech channel, thereby, spectrum-despread information is output to the network side.

In the same way, in the receiving time slot $R_2$, time-divided CDMA channel #61-R2 is selected, and a signal from a mobile station is correlatively detected with a spread-spectrum code, characteristic of the speech channel, in the signal processing unit 121, thereby, the spectrum-despread information is output to the mobile switching center 6 on the side of the network. The speech channel is a time-divided CDMA channel for low-speed data transmission, however, the down-link corresponding to the above-mentioned channel is assigned a high-speed TDMA channel (A speech channel:#71-T2 in the transmitting time slot $T_2$ shown in FIG. 3 corresponds to this high-speed TDMA channel), which shows that the up-link and the down-link are not symmetric.

In the transmitting slot $T_7$ shown in FIG. 3, 3T, that is, a high-speed TDMA data channel #71-T7A is selected by the switch 144. Further, the predetermined transmitting time slot $T_3$ is in the down-link and is #71-T3 which handles a high-speed TDMA data channel, and 2 down-links comprise the same transmission rate, and 2 channels in the CDMA#61-R1 are corresponding channels in the up-link.

The operations of switches 154 and 159, are the same as those of switches 144 and 149, so that their explanation will be omitted.

The management of communication channel assignment is performed by the mobile switching centers, 6 and 7, and the instruction of channel assignment is given by the mobile switching center 6 or 7, to at least one base station 1, 3 or 2.

As mentioned in the above, according to the embodiment 5, a base station and a mobile station are respectively provided with switches which select communication systems in synchronization with time slots, so that by assigning channels having different communication systems from each other to a down-link and an up-link, an asymmetric channel may be realized. Thereby, there is an effect that both asymmetry in transmitting communication capacity and asymmetry in time are realized, which is needed in the circumstances such as multimedia.

Embodiment 6

Next, the management of mobile station information concerning services which mobile stations may be able to enjoy will be explained in the following as an embodiment 6 according to the present invention.

Figure 14:
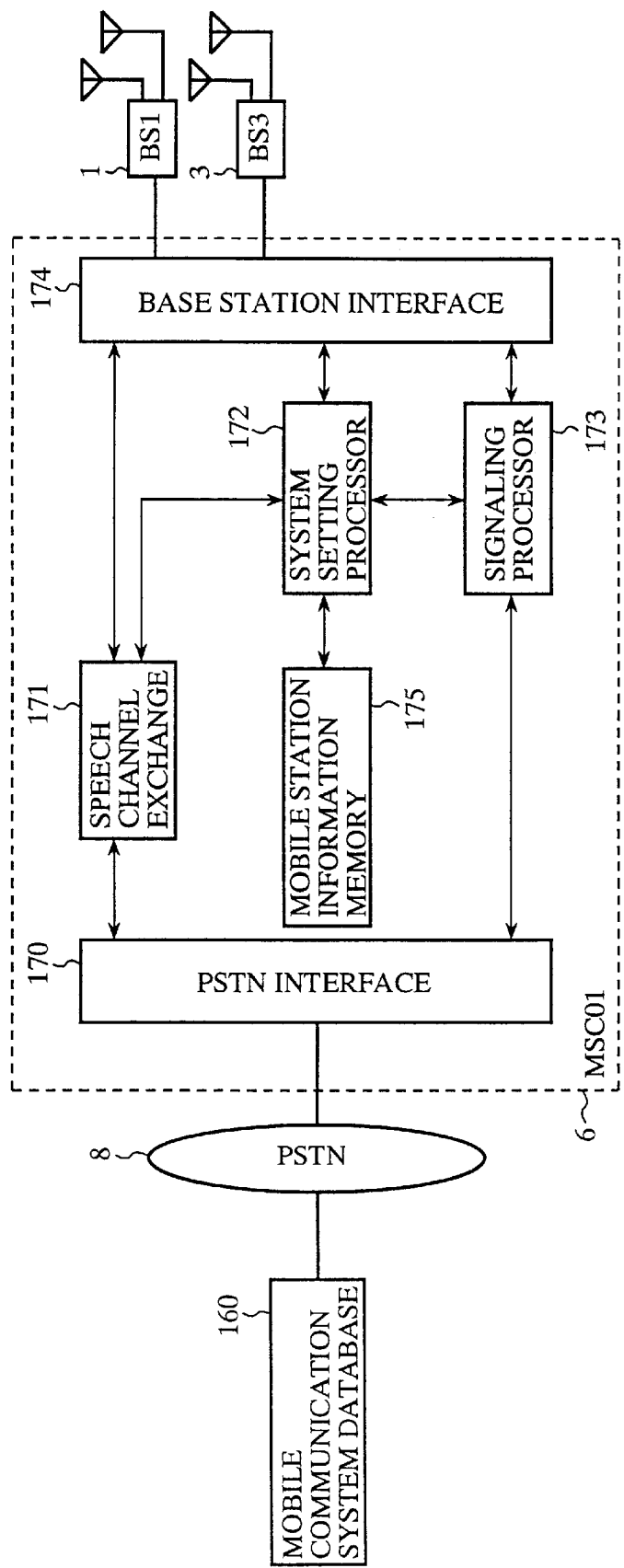
FIG. 14 shows a block diagram showing the constitution of a mobile switching center in an embodiment 6 according to the present invention.

FIG. 14 shows a block diagram showing the constitution of a mobile switching center having the management function of mobile station information as mentioned in the above. In the drawing, a reference numeral 6 denotes a mobile switching center (MSC01) which is shown in FIG. 1 with the same reference numeral, 1 and 3 denote base stations (BS1 and BS3) being connected to the mobile switching center 6, 8 denotes a public switching telephone network (PSTN) in which the mobile switching center 6 is accommodated. A reference numeral 160 is a database of a mobile communication system being connected to a public switching telephone network 8, and the database stores the mobile station information of all mobile stations in the mobile communication system concerning the services and so on which will be enjoyed by all of them.

In the mobile switching center 6, 170 denotes a PSTN interface which performs transmission/reception of information including signaling signals, such as dial signals, information of communication charges, and information of private personal codes, and so on, 171 denotes a speech path exchange unit which transmits the information obtained from a public switching telephone network to a base station related to a mobile station, a receiving terminal, and transmits the information obtained from the mobile station through the base station to the public switching telephone network 8. A reference numeral 172 denotes a system setting processor which selects a radio system to connect a base station and a mobile station and instructs to set the selected radio system between the base station and the mobile station, and 173 denotes a signaling processor which processes the number of a mobile station to be connected or private code procedures for collecting charges. A reference numeral 174 denotes a base station interface which communicates with respective base stations concerning the information to be transmitted to mobile stations through base stations, signaling information with mobile stations, system information which stipulates radio connection, and so on. A reference numeral 175 denotes a mobile station information memory which is provided in a mobile station belonging to the mobile switching center 6 or in a cell of a base station being controlled presently by the mobile switching center 6, and the mobile station information concerning mobile stations being connected to these base stations is registered in the mobile station information memory.

FIG. 15 shows an illustrative drawing showing an example of mobile station information registered in the mobile station information memory 175. The management of mobile station information will be explained referring to FIG. 15.

In the example shown in FIG. 15, a mobile station (multimedia station 5) having a subscriber's number of DS51-727 is able to set 3 kinds of communication channels except a control channel between the own station (multimedia station 51) and a base station. In multimedia circumstances, both mobile station and base station are able to perform communication in freely switching over these 3 kinds of communication channels, a TDMA voice frequency/low-speed data channel, a time-divided CDMA voice frequency/low-speed data channel, and a high-speed TDMA data channel (transmission/reception) according to the speed of information to be transmitted. Moreover, in this mobile communication system, these 3 kinds of communication channels may be arbitrarily selected for an up-link or a down-link, and further, the transmission speed of communication information may be changed as occasion demands.

In the mobile station having a subscriber's number of MS32-728 (ordinary mobile station 32) comprises only 2 kinds of communication channels except a control channel. The ordinary mobile station 23 is a mobile terminal of a conventional type which does not require transmission of a large information quantity of data such as image data, so that it does not comprise a high-speed data transmission channel. In other words, the mobile station comprises only a TDMA voice frequency/low-speed data channel and a time-divided CDMA voice frequency/low-speed data channel, but no high-speed TDMA data channel.

In the case where a high-speed TDMA data communication function is assigned, a mobile station having only the function of reception and that having the function of both transmission and reception are discriminated from each other. For example, a mobile station having a subscriber's number of DS51-727 (multimedia station) and a mobile station having a subscriber's number of WS42-727 (WLL station 42) are mobile stations having a function of both transmission and reception, and a mobile station having a subscriber's number of DS52-728 (multimedia station 52) comprises only a receiving function concerning high-speed TDMA data communication.

The mobile information as shown in FIG. 15 is transmitted from a database 160 of the mobile communication system shown in FIG. 14 to the mobile switching center 6. In the database 160 of the mobile communication system, mobile station information of all motile stations is stored, however, to the mobile switching center 6 only the mobile station information concerning the mobile stations related to the mobile switching center 6 is transmitted and the information is stored in the mobile station information memory 175 in the mobile switching center 6. The registration of the mobile switching center information to the information memory 175 of the mobile switching center is created by a call or position registration of a mobile station in a cell of the base station 1 or 3, controlled by the mobile switching center 6, or by an inquiry of the existence of a mobile station assigned by another mobile switching center.

In case the mobile switching center 6 assigns communication channels to mobile stations which belong to the mobile switching center 6 or are in the cells of the base station 1 or 3 and are wirelessly connected to the base stations 1 or 3, it accesses the mobile station information memory 175 and recognizes the services which may be enjoyed by the mobile station and assigns channels corresponding to the recognition.

When a mobile station communicates with a base station using the mobile station information registered in the mobile station information memory 175 of the mobile switching center 6, the new information in the mobile station information memory 175 concerning the mobile station is transferred to the public switching telephone network and transferred to the database 160 of the mobile communication system through the public switching telephone network. Thus, the contents accumulated in the database of the mobile communication system are revised.

As mentioned in the above, according to the embodiment 6, since a mobile station information memory for registering mobile station information of mobile stations under the control of the mobile switching center is provided in the mobile switching center, it makes the mobile switching center know easily the services which may be enjoyed by mobile stations under the control of the mobile switching center. Thereby, there is a merit that channel assignment may be effectively executed.

Embodiment 7

Next, data transmission of a large information quantity with a high-speed data transmission channel will be explained in the following as an embodiment 7 according to the present invention.

Figure 16:
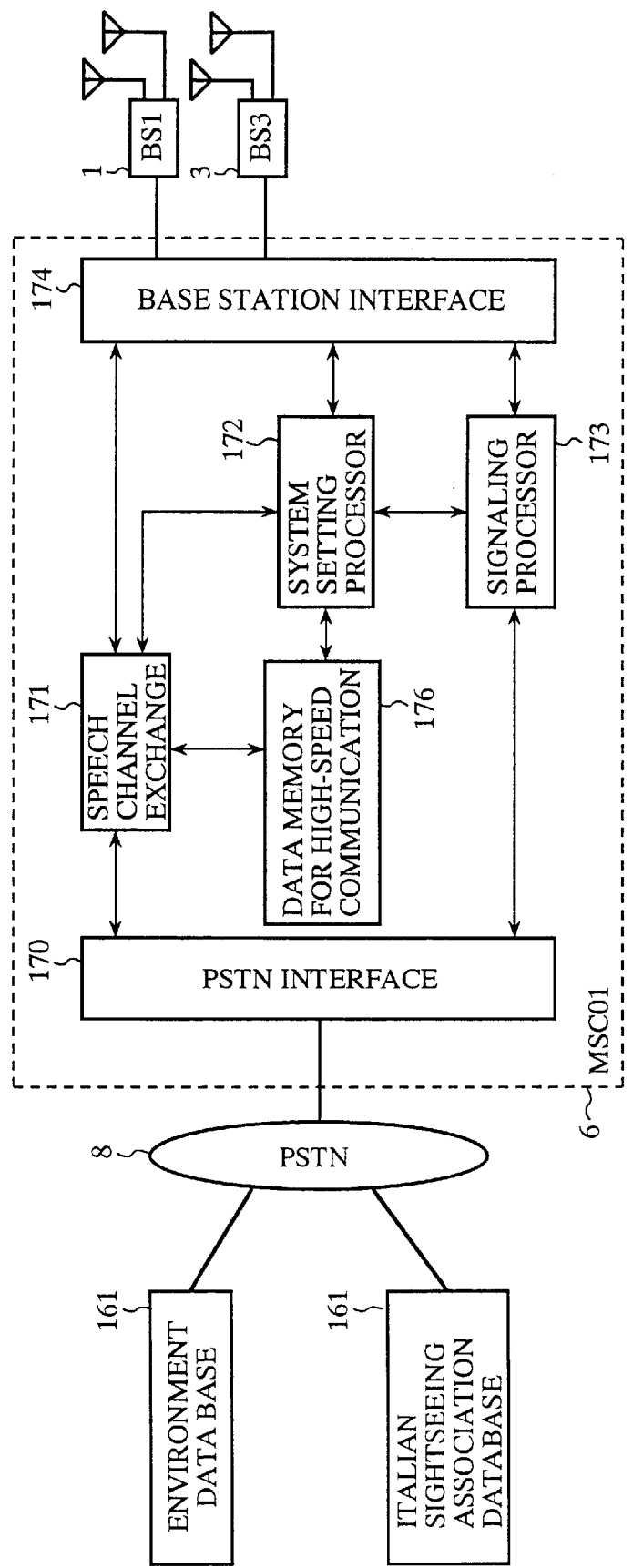
FIG. 16 shows a block diagram showing the constitution of a mobile switching center in an embodiment 7 according to the present invention.

FIG. 16 shows a block diagram showing the constitution of a mobile switching center provided with management function of a high-speed data channel. In the drawing, 1 and 3 denote base stations (BS1 and BS3), 6 denotes a mobile switching center (MSC01), and 8 denotes a public switching telephone network (PSTN). In the mobile switching center 6, 170 denotes a PSTN interface, 171 denotes a speech channel exchange unit, 172 denotes a system setting processor, 173 denotes a signaling processor, and 174 denotes a base station interface. These components correspond to those having the same reference numerals shown in FIG. 14, so that detailed explanation will be omitted.

A reference numeral 161 shows a system which handles a large information quantity which is a call originating source of high-speed data requested by a mobile station, and it may be connected with the mobile switching center 6 through the public switching telephone network, and here in this place, an environment database and Italian Tourist Society database are shown as examples. In the following explanation, various kinds of databases as systems to be call originating sources are simply called databases. A reference numeral 176 in the mobile switching center 6 denotes a memory device for high-speed data communication which temporarily stores high-speed data transmitted/received between a mobile station and the database 161 when a mobile station is connected to the database 161.

Next, the function of the above-mentioned memory device for high-speed data communication 176 will be explained. When a mobile station is being connected to the database 161, a case where a control signal is transmitted from the mobile station to the database 161 will be considered. It is assumed that an instruction of "stop data transmission", for example, as a control information is transmitted from a mobile station to the database 161. In such a case, it is supposed that a relatively large quantity of high-speed data would have been sent out from the database 161 before the command reaches the database 161 through a base station, 1 or 3, the mobile switching center 6 and a public switching telephone network 8.

If the instruction "stop data transmission" is issued in a case where the connection with the base station is to be cut off when the work in the mobile station is over, there is no problem. In such a case, the high-speed data which have been transmitted from the database 161 before the instruction reaches the database 161 may be abandoned without sending them to the mobile station.

However, when the instruction "stop data transmission" is issued to give a user a period of time for consideration, following the instruction "stop data transmission", when the user's consideration is finished, another instruction "transmit data" may be issued from the mobile station again to the database 161. In preparation for such a case, a memory device 176 for high-speed data communication is provided in the mobile switching center 6 and the high-speed data sent out until the stop of transmission from the database 101 to the mobile switching center 6 are temporarily stored in the memory device 176 for the high-speed data communication.

FIG. 17 shows an illustrative drawing showing minimum necessary related information for managing the contents of the memory device for high-speed data communication 176 in the form of a table, and the related information includes the following: a database name to be a call originating source of high-speed data, the oldest time of reception of information among the residual information received from the database, the mobile station number to which data are transmitted, the latest time of transmission of data to a mobile station, the stored information number at the head of the residual information and the stored information number at the end of the residual information, the quantity of residual information, a corresponding control system, and so on.

FIG. 18 shows a flow chart showing a control process of the memory device for high-speed data communication 176.

In the following, the data transmission of a large information quantity with a high-speed transmission channel will be explained referring to FIG. 17 and FIG. 18, in taking an example of a case where the instruction, "stop data transmission", is issued from a mobile station during the transmission of high-speed data from the database 161 to the mobile station.

When an instruction, "data transmission" is issued by a mobile station, at first in step ST11, the database 161 assigned by the instruction and the mobile switching center 6 are connected through the public switching telephone network 8 and the mobile switching center receives necessary high speed data from the database 161. Next, in step ST12, the mobile switching center 6 transmits the data received from the database 161 to a mobile station using a down-link, from the base station to the mobile station, with a high-speed TDMA data transmission system.

Next, in step ST13, the existence of an instruction, "stop data transmission" is investigated, and if there is not, the process is brought back to step ST12, and as far as the instruction, "data transmission" exists, the transmission of high-speed data received from the database 161 is repeated.

At this time, assuming that an instruction, "stop data transmission" addressed to the database 161 is transmitted by the mobile station to the mobile switching center 6 through the base station. When the mobile switching center 6 reads the instruction, the process is advanced to step ST13 and step ST14, and the transmission of high-speed data to the mobile station is stopped and at the same time an instruction, "stop data transmission" is issued to the database 161. When the mobile station issues the instruction, "stop data transmission", if the high-speed data transmitted from the database 161 are normally received in the mobile station, it transmits the last number of the received high-speed data as a part of a control signal.

To be concrete, the last number of the high-speed data which are normally received is dealt as shown below: a series of time slot numbers are given to respective multi-frames of the high-speed data, and when the mobile station receives high-speed data normally, the time slot number of the high-speed data received in the last time is detected and the time slot number is transmitted as a normal time slot number to the mobile switching center 6 through the base station being connected to the mobile station.

On the other hand, in step ST15, in the mobile switching center 6, after the instruction, "stop data transmission" has been issued, the high-speed data continued to be transmitted from the database 161 are not abandoned and stored in the memory device for high-speed data communication 176. In other words, the mobile switching center 6 receives the normal time slot number which is sent from a mobile station when it receives high-speed data normally, and the high-speed data having slot numbers on and after the one next to the normal slot number are not abandoned immediately and they are stored in the memory device for high-speed data communication 176. When the mobile switching center 6 receives the normal time slot number, the high-speed data having slot numbers on and before the normal time slot number are eras ed from the memory device for high-speed data communication 176.

Next, in step ST16, it is investigated that the instruction, "data transmission", which instructs the resumption of data transmission is issued again from the mobile station to the mobile switching center or not. In the result, if there is, the process is brought back to step ST12, and the high-speed data having time slot numbers on and after the one next to the normal slot number received from the mobile station are read out of the memory device for high-speed data communication 176 and the transmission of the high-speed data to the mobile station is resumed.

On the other hand, when there is not re-transmission of the instruction, "data transmission", the process is advanced to step ST17, and it is investigated whether the mobile station has cut off the connection or not. If not, process is brought back to step ST16 and the existence of re-transmission of the instruction, "data transmission" is investigated.

In a case where a user finishes his work and cuts off a channel which has been used in leaving high-speed data in the memory device for high-speed data communication 176, process is advanced to step ST18 from step ST17, and the information quantity of high-speed data left in the memory device for high-speed data communication 176, that is, the information quantity of high-speed data having time slot numbers of on and after the one next to the normal time slot number is informed to the database 161 through the public switching telephone network 8. The data concerning the residual information quantity sent to the database 161 as mentioned in the above, are the high-speed data which were sent to the mobile switching center 6 but not to the mobile station, and the data are used for such a case where the database offerer deducts the rates for the data not delivered.

In the mobile switching center 6, when the data received from the database 161 through the public switching telephone network are stored in the memory device for high-speed data communication 176, the high-speed data are sectioned in blocks in a way that each block may be transmitted within a time slot, and every block is assigned a storage information number so that the mobile switching center is able to control these blocks. Further, it is also possible to give a function as shown below to a base station which receives high-speed data from a mobile switching center 6 and transfers the data to a mobile station: the time slot numbers used when high-speed data are transmitted to a mobile station are compared with the storage information number added by the mobile switching center 6, and these two kinds of numbers are incorporated into one set of information and the information is transmitted to the mobile switching center 6, and the management and control of the memory device for the high-speed data communication 176 is performed based on the information.

During the period of time in which the mobile switching center 6 is transmitting the high-speed data stored in the memory device for high-speed data communication 176 to a mobile station through a connected base station, when the information quantity of high-speed data left in the memory device for high-speed data communication 176 becomes lower than a predetermined level of quantity, the mobile switching center 6 requires the transmission of succeeding data to the database 161 through the public switching telephone network 8.

In a case where the high-speed data sent from the mobile switching center 6 through a connected base station are not received normally by a mobile station, the mobile station detects the time slot number in the high-speed data and transmits the slot number as an abnormal time slot number to the mobile switching center 6 through a connected base station. When the mobile switching center 6 receives the abnormal time slot number, it reads the high-speed data having the same time slot number as the abnormal time slot number out of the memory device for high-speed data communication 176 and send them again through the connected base station.

As mentioned in the above, according to the embodiment 7, the mobile switching center is provided with a memory device for high-speed data communication for storing the high-speed data to be transmitted to a mobile station temporarily, so that it is able to correspond promptly for the transmission request of high-speed data from a user, and a partial missing in the information of high-speed data may be prevented, and furthermore, communication rates corresponding to the quantity of information transmitted to a user may be correctly calculated by notifying the residual information quantity to the database.

Embodiment 8

Next, the explanation concerning the management of channels in respective mobile stations will be given in the following as an embodiment 8 according to the present invention.

FIG. 19 shows an illustrative drawing showing an example of a control table of communication channels in respective mobile stations, and as an example, a control table of communication channels of respective mobile stations under the control of a base station (BS1). The mobile switching center and at least one base station being under the control of the mobile switching center are provided with mobile station control memories respectively, and the communication channel control table shown in FIG. 19 is stored in the mobile station control memory.

According to the example shown in FIG. 19, a mobile station (multimedia station 51) having a station code of DS51-727 is assigned a high-speed TDMA data channel for the down-link and a time-divided CDMA low-speed data channel (or a voice frequency channel) for the up-link. The example shown in this place shows a case where an asymmetric channel having different links for the down-link and the up-link is assigned to a mobile station. On the other hand, a mobile station having a station code of WS42-727 (WLL station WS42) is assigned control channels for intermittent connection for both down-link and up-link, which may indicate that the user of the mobile station is under consideration.

As shown in the above-mentioned examples, the mobile communication system is able to handle both an asymmetric channel and a symmetric channel.

Including the assignment of a transmission type, it is also possible to assign a time slot as shown in FIG. 19. For example, in an up-link, a time-divided CDMA voice frequency/low-speed data channel, of a multimedia station 51 having a station code of DS51-727, a time slot of #61-R2-07 is assigned. The time slot number is the same as that shown in FIG. 3. The time slot #61-R2 denotes a time slot positioned at the second row from the top of the time slot column on the left side in FIG. 3, and the succeeding code -07 denotes a channel having a spread-spectrum code called the seventh in the code-division multiple access (CDMA) including a plurality of the time slots.

In the up-link, "a control information channel for intermittent connection" of WLL station 42 having a station code WS42-727 a time slot called #61-R3-05:36 is assigned, and the time slot name is the same as the time slot name shown in FIG. 3. The time slot #61-R3 denotes a time slot at the highest row of the time slot column on the left side in FIG. 3. The succeeding code -05 denotes a channel having a spread-spectrum code called the fifth of code-division multiple access (CDMA) including a plurality of time slots, and further succeeding code :36 shows that it is the information included in the 36th time slot in a multi-frame (be composed of 40 frames).

In the columns of a transmission type and a time slot name shown in FIG. 19, the channels of a transmission type with an underline and a time slot name with an underline show the ones being used at the present point of time. Naturally, a transmission type in operation may be switched to another momentarily by the requirement of a user or according to the contents of data from the database being transmitted. Furthermore, in the present mobile communication system, the up-link and the down-link may be independently set of each other.

In FIG. 19, 2 representative examples are shown, however for every subscriber in the communication system his communication channel may be set as shown in FIG. 19.

As mentioned in the above, in a case where a mobile switching center operates channels assigning time slots corresponding to respective transmission types, when the operation of a channel which is assigned to a time slot corresponding to the present transmission type is finished, the above time slot assignment is stored in the built-in management memory for mobile stations as a history. When the same transmission type is assigned, the mobile switching center assigns a time slot which has been actually used kept in the history being left in the mobile station control memory and operates the channel for the above-mentioned transmission type.

In a case where a time slot name which has a history of actual use in the past is stored in the mobile station control memory as a time slot not in use, the mobile switching center erases the history of a time slot having an actual use only when a time slot name of the same transmission type which does not have the history of an actual use in the past is not found in the mobile station control memory, and the erased time slot name is assigned to be used for a new mobile station. The following method is also possible: when the history of a time slot which has a history of an actual use in the past is erased, a time slot name which has the oldest history of an actual use is selected and it is assigned as a time slot to be used for a new mobile station.

As mentioned in the above, according to the embodiment 8, owing to the arrangement in which a communication channel control table is stored in mobile station management memories provided in a mobile switching center and at least one base station which is under the control of the mobile switching center, an up-link and a down-link between a mobile station and a base station may be set with different type of communication links independently of each other.

INDUSTRIAL APPLICABILITY

A mobile communication system according to the present invention comprises a FDMA/TDMA digital communication channel and a time-slot-common-use and frequency-channel-common-use time-divided CDMA signal channel (common channel) on the frequency axis, wherein a plurality of mobile stations and a base station are connected with two-way communication channels such as FDMA/TDD system, multi-carrier TDMA system, CDMA/TDD system, or time-divided CDMA system using signals modulated by digital modulation system. The present system is useful when it is applied to a mobile communication system which corresponds to multimedia circumstances.

What is claimed is:

1. A mobile communication system, comprising:
   a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal,
   wherein at least some of said plurality of said mobile stations include a high-speed data transmitter that has a high-speed data transmission function and are radio-connected to said at least one base station with a high-speed data channel, and
   wherein said communication system includes a single communication channel between said base station and at least one high-speed data transmission function mobile station in said mobile communication system is constituted as an asymmetric channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, such that an information quantity in a down-link from said base station to one of said high-speed data transmission function mobile stations, and an information quantity in an up-link from said one mobile station to said base station are different from each other.

2. A mobile communication system according to claim 1, wherein said communication system with a TDD system changes a ratio between a total information quantity in the down-link transmitted from said base station, and a total information quantity in the up-link received in said base station by shifting a TDD line in the direction of time axis in a frame, said TDD line forming a border between the down-link and the up-link in coordinate axes of a frame-time axis and a frequency axis.

3. A mobile communication system according to claim 1, wherein said system comprises an asymmetric channel in which a down-link from a base station to a mobile station is a high-speed TDMA data channel and an up-link from said mobile station to said base station is a low-speed TDMA data channel.

4. A mobile communication system according to claim 1, wherein said system comprises an asymmetric channel such that a down-link from a base station to a mobile station is a high-speed TDMA data channel, and that an up-link from said mobile station to said base station is a low-speed time-divided CDMA data channel.

5. A mobile communication system according to claim 1, wherein said system comprises an asymmetric channel such that a down-link from a base station to a mobile station is a low-speed TDMA data channel, and that an up-link from said mobile station to said base station is a high-speed TDMA data channel.

6. A mobile communication system according to claim 1, wherein said system comprises an asymmetric channel such that a down-link from a base station to a mobile station is a low-speed time-divided CDMA data channel, and that an up-link from said mobile station to said base station is a high-speed TDMA data channel.

7. A mobile communication system according to claim 1, wherein said system comprises either of at least one TDMA burst signal or at least one time-divided CDMA burst signal or both of them.

8. A mobile communication system according to claim 1, wherein said system comprises a mobile switching center having a function to instruct said at least one base station to change an information quantity in an up-link from a mobile station to said base station, and to change an information quantity in a down-link from said base station to said one mobile station.

9. A mobile communication system, comprising:
   a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal,
   wherein at least some of said plurality of said mobile stations include a high-speed data transmitter that has a function of high-speed data transmission and are radio-connected to said at least one base station with a high-speed data channel,
   wherein said system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, such that the information quantity in a down-link from said base station to at least one high-speed transmission function mobile station, and the information quantity in an up-link from said at least one high-speed transmission function mobile station to said base station are different from each other, and wherein when data transmission of a large information quantity is finished in either or both of said up-link and said down-link, the asymmetric communication channel is immediately switched over to a small quantity data transmission channel.

10. A mobile communication system according to claim 9, wherein when a base station and a mobile station are radio-connected with a small quantity data transmission channel, and if for a predetermined period of time, data transmission is not executed, said small quantity data transmission channel is switched over to a control channel for connection which transmits only control data.

11. A mobile communication system according to claim 10, wherein in a state that a base station and a mobile station are radio-connected with a control channel for connection, if there occurs a necessity of data transmission of a large information quantity in either of an up-link from said mobile station to said base station, or a down-link from said base station to said mobile station, or both of them, said control channel for connection may be immediately switched over to a large quantity data transmission channel.

12. A mobile communication system according to claim 10, wherein when a base station and a mobile station are radio-connected with a control channel for connection, if a necessity occurs of transmission of data of small information quantity in either of an up-link from said mobile station to said base station, or a down-link from said base station to said mobile station, or both of them, said control channel for connection is immediately switched over to a small quantity data transmission channel.

13. A mobile communication system according to claim 9, wherein when a base station and a mobile station are radio-connected with a small quantity data transmission channel, if a necessity occurs of data transmission of a large information quantity in either of an up-link from said mobile station to said base station, or a down-link from said base station to said mobile station, or both of them, said small quantity data transmission channel is immediately switched over to a large capacity data transmission channel.

14. A mobile communication system according to claim 9, wherein said system comprises a mobile switching center provided with a function to instruct at least one base station to perform the management of an asymmetric communication channel and the changeover of said asymmetric communication channel.

15. A mobile communication system, comprising:

a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal, wherein at least some of said plurality of said mobile stations include a high-speed data transmitter that has a high-speed data transmission function and are radio-connected to said at least one base station with a high-speed data channel, wherein said mobile communication system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, in which the information quantity in a down-link from said base station to at least one high-speed transmission function mobile station, and the information quantity in an up-link from said at least one high-speed transmission function mobile station to said base station are different from each other, and wherein said mobile communication system further comprises small capacity data transmission channels utilizing a multi-frame system which are independent of each other in said up-link and down-link respectively.

16. A mobile communication system according to claim 15, wherein during the period of time while data are not transmitted between a base station and a mobile station, said small capacity data transmission channel is a control information channel for intermittent connection for transmitting control data.

17. A mobile communication system according to claim 16, wherein the control information channel for intermittent connection transmits, besides ordinary control data, control data showing that no data are being transmitted during a period of time from a transmission of a large information quantity of data from a base station to a mobile station until a response to receipt of said large information quantity of data has been transmitted by said mobile station.

18. A mobile communication system according to claim 16, wherein said mobile communication system comprises a mobile switching center which performs the management of a control information channel for intermittent connection and comprises a function to instruct at least one base station in the starting, switching, and suspension of said control information channel for intermittent connection.

19. A mobile communication system, comprising:

a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal, wherein at least some of said plurality of said mobile stations include a high-speed data transmitter that has a high-speed data transmission function and are radio-connected to said at least one base station with high-speed data channels, wherein said mobile communication system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, such that an information quantity in a down-link from said base station to at least one high-speed transmission function mobile station, and the information quantity in an up-link from said at least one high-speed transmission function mobile station to said base station are different from each other, and wherein a TDMA data channel is used as a high-speed data channel and a time slot in said TDMA data channel is composed of a plurality of micro time slots connected in series.

20. A mobile communication system according to claim 19, wherein the bit constitution of a micro time slot in a high-speed data channel is the same as that of a time slot in a low-speed TDMA data transmission channel.

21. A mobile communication system according to claim 19, wherein an equalizer to be used for a high-speed TDMA data channel is arranged to have the same constitution an equalizer to be used in a low-speed TDMA data channel except the operation speed.

22. A mobile communication system according to claim 19, wherein when a high-speed TDMA data channel is constituted with a plurality of micro time slots, the guard time of the high-speed TDMA data channel is changed in the unit of a micro time slot according to the moving speed of a mobile station.

23. A mobile communication system according to claim 19, wherein said system comprises a mobile switching center which manages the constitution of a micro time slot in a high-speed TDMA data channel and is provided with a function to instruct at least one base station to change the constitution of a micro time slot including the length of a guard time of said high-speed TDMA data channel.

24. A mobile communication system, comprising:

a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal, wherein at least some of said plurality of said mobile stations include a high-speed data transmitter that has a high-speed data transmission function and are radio-connected to said at least one base station with a high-speed data channel, wherein said mobile communication system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, such that an information quantity in a down-link from said base station to at least one high-speed transmission function mobile station, and an information quantity in an up-link from said at least one mobile station to said base station are different from each other, and wherein said base station and said at least one mobile station are provided with switches respectively for selecting a communication system which is able to transmit a necessary information quantity in synchronization with time slots.

25. A mobile communication system according to claim 24, wherein said base station comprises a memory for channel assignment which enables a down-link and an up-link to and from a mobile station in a communication channel to be set to be independent of each other, said communication channel being constituted with a combination of a frequency and a time slot.

26. A mobile communication system according to claim 24, wherein said mobile communication system further comprises a mobile switching center which controls channel assignment and i s provided with a function to instruct said base station in the assignment of communication channels.

27. A mobile communication system, comprising:

a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal, wherein at least some of said plurality of said mobile stations include a high-speed data transmitter that has a high-speed data transmission function and are radio-connected to said at least one base station with a high-speed data channel, wherein said mobile communication system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, in which an information quantity in a down-link, from said base station to at least one high-speed transmission function mobile station, and an information quantity in an up-link, from said at least one mobile station to said base station, are different from each other, and a mobile switching center connected to said plurality of mobile stations, said mobile switching center being provided with a mobile station information memory for storing mobile information including the information showing the services to be provided to said mobile stations which are under the control of said mobile switching center.

28. A mobile communication system according to claim 27, wherein a mobile switching center performs the management of mobile station information concerning mobile stations being under the control of said mobile switching center and comprises a function to instruct at least one base station in the starting, switching and suspension of services based on said mobile station information.

29. A mobile communication system according to claim 27, wherein a mobile switching center performs the management of the mobile station information concerning the mobile stations being under the control of said mobile switching center, and in a case that an amendment occurs in said mobile station information, said mobile switching center is provided with a function to transfer the amended mobile station information to the database of said mobile communication system which contains the mobile station information concerning all mobile stations in said mobile communication system.

30. A mobile communication system, comprising:

a plurality of mobile stations and at least one base station, said mobile stations and said base station being radio-connected to each other using a multiple access system of a time-slot-shared and frequency-channel-shared type having a TDMA signal, and either a time-slotshared and frequency-channel-shared time-divided CDMA signal, or a time-slot-shared time-divided CDMA signal, wherein at least some of said plurality of said mobile stations include a high-speed data transmitter that has a high-speed data transmission function and are radio-connected to said at least one base station with a high-speed data channel, wherein said mobile communication system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, in which an information quantity in a down-link, from said base station to at least one high-speed data transmission function mobile station, and an information quantity in an up-link, from said at least one mobile station to said base station, are different from each other, and a mobile switching center connected to said base station, said mobile switching center being provided with a memory device for high-speed data communication to temporarily store the high-speed data transmitted to said at least one mobile station.

31. A mobile communication system according to claim 30, wherein when the high-speed data transmitted from a mobile switching center through a connected base station are normally received in a mobile station, said mobile station detects a time slot number of the last high-speed data and transfers the slot number as a normal slot number to said mobile switching center through said base station.

32. A mobile communication system according to claim 31, wherein a mobile switching center performs the management of high-speed data to be transmitted to a mobile station and receives said normal time slot number transmitted from said mobile station which has received said high-speed data, and stores high-speed data having slot numbers on and after the slot number next to the normal slot number in the memory device for high-speed communication.

33. A mobile communication system according to claim 32, wherein a mobile switching center performs the management of high-speed data to be transmitted to a mobile station, and when there is a request from said mobile station to said mobile switching center to transmit said high-speed data again, said switching center reads the high-speed data having time slot numbers on and after the time slot number next to the normal time slot number out of the memory device for high-speed data communication and transmits the high-speed data to said mobile station through the base station.

34. A mobile communication system according to claim 30, wherein when a mobile switching center receives the high-speed data to be transmitted to a mobile station from the call originating source of the high-speed data through a public switching telephone network in which said mobile switching center is accommodated and stores the data in said memory device for high-speed data communication, the high-speed data are sectioned into blocks of data so that each block of data may be transmitted in a time slot, and each block is numbered with a storage information number for management.

35. A mobile communication system according to claim 34, wherein a base station which transmitted high-speed data to a mobile station contrasts the time slot number of the transmitted high-speed data to the storage information number numbered by the mobile switching center to which the base station is connected, and incorporates said time slot number and said storage information number into a set of information and notifies the information to said mobile switching center.

36. A mobile communication system according to claim 31, wherein a mobile switching center performs the management of the high-speed data to be transmitted to mobile stations and is provided with a function to erase the high-speed data having time slot numbers on and before the normal time slot number from the memory device in which the high-speed data are stored.

37. A mobile communication system according to claim 31, wherein a mobile switching center performs the management of the high-speed data to be transmitted to mobile stations and is provided with functions such that when a mobile station finishes communication, the information quantity of high-speed data left in the memory device for high-speed data communication having time slot numbers on and after the time slot number next to the normal time slot number transmitted from said mobile station through the base station is notified to the call originating source of said high-speed data.

38. A mobile communication system according to claim 33, wherein a mobile switching center performs the management of the high-speed data to be transmitted to mobile stations and the mobile switching center is provided with a function such that when said high-speed data requested by said mobile station are being transmitted to a base station, at the point of time when the information quantity of said high-speed data left in the memory device for high-speed data communication reaches a level lower than a predetermined level, the mobile switching center requests the transmission of the succeeding high-speed data for the call originating source of the high-speed data through the public switching telephone network.

39. A mobile communication system according to claim 30, wherein when high-speed data transmitted from a mobile switching center through connected base station are not received normally by a mobile station, the mobile station detects the time slot number of the transmitted high-speed data and transmits the number as an abnormal time slot number to said mobile switching center through the connected base station.

40. A mobile communication system according to claim 39, wherein a mobile switching center performs the management of the high-speed data to be transmitted to mobile stations, and when said high-speed data are not received normally in a mobile station, the mobile switching center, at the reception of the abnormal time slot number, reads the high-speed data having the same time slot number as the abnormal time slot number out of the memory device for high-speed data communication, and transmits the high-speed data again to said mobile station.

41. A mobile communication system, comprising:

a plurality of mobile stations and at least one base station, said mobile stations and said base station being radio-connected to each other using a multiple access system of a time-slot-shared and frequency-channel-shared type having a TDMA signal, and either a time-slot-shared and frequency-channel-shared time-divided CDMA signal, or a time-slot-shared time-divided CDMA signal, wherein at least some of said plurality of said mobile stations include a high-speed data transmitter that has a high-speed data transmission function and are radio-connected to said at least one base station with high-speed data channels, wherein said mobile communication system further comprises an asymmetric communication channel using said high-speed data channel for high-speed data transmission, and using one of said TDMA signal, time-slot shared and frequency-channel-shared time-divided CDMA signal or time-slot-shared time-divided CDMA signal for communication signal transmission other than high-speed data transmission, such that an information quantity in a down-link from said base station to at least one high-speed transmission function mobile station, and the information quantity in an up-link from said at least one high-speed transmission function mobile station to said base station are different from each other, a mobile switching center connected to said at least one base station, said mobile switching center being provided with a mobile station management memory for storing a communication channel management table to be used for the management of communication channels connecting said mobile switching center and respective mobile stations, and wherein said mobile switching center assigns a time slot corresponding to the transmission type and after the operation of assignment of the time slot corresponding to the present transmission type is finished, the assigning operation of the time slot is stored in said mobile station management memory as a history, and in a case that the same transmission type is requested again, the time slot having an actual use in the past existing in the history stored in said mobile station management memory is used.

42. A mobile communication system according to claim 41, wherein when the name of a time slot which has a history of actual use in the past is stored in a mobile station management memory as a time slot presently being not used, only when a time slot name which does not have a history of actual use in the past of the same kind of transmission type is not found in said mobile station management memory, the history of the time slot name which has the history of actual use in the past is erased from said mobile station management memory and it is assigned to a new mobile station.

43. A mobile communication system according to claim 41, wherein when the name of a time slot which has a history of actual use in the past is stored in a mobile station management memory as a time slot not being used presently, when a time slot name which does not have a history of actual use in the past of the same kind of transmission type is not found in said mobile station management memory and the history of the time slot name which has the history of actual use in the past is erased from said mobile station management memory, a time slot which has the oldest history of actual use in the past is selected and it is assigned to a new mobile station.

* * * * *